(12) United States Patent
Wai et al.

(10) Patent No.: US 7,479,774 B2
(45) Date of Patent: Jan. 20, 2009

(54) HIGH-PERFORMANCE SOLAR PHOTOVOLTAIC (PV) ENERGY CONVERSION SYSTEM

(75) Inventors: Rong-Jong Wai, Liouying Township, Tainan County (TW); Wen-Hung Wang, Dali (TW)

(73) Assignee: Yuan Ze University, Taoyuan (TW)

( * ) Notice: Subject to any disclaimer, the term of this patent is extended or adjusted under 35 U.S.C. 154(b) by 124 days.

(21) Appl. No.: 11/399,342

(22) Filed: Apr. 7, 2006

(65) Prior Publication Data

US 2007/0236187 A1   Oct. 11, 2007

(51) Int. Cl.
 *H02M 3/335* (2006.01)
 *H02M 3/24* (2006.01)
 *H02M 7/44* (2006.01)

(52) U.S. Cl. .................. 323/284; 323/222; 323/904; 363/17; 363/98; 363/132

(58) Field of Classification Search ............ 323/222, 323/284, 906; 363/17, 98, 132
See application file for complete search history.

(56) References Cited

U.S. PATENT DOCUMENTS

| | | | |
|---|---|---|---|
| 5,815,386 A * | 9/1998 | Gordon .................. 363/50 |
| 6,680,693 B2 * | 1/2004 | Urban et al. ............ 342/357.06 |
| 7,023,186 B2 * | 4/2006 | Yan ........................ 323/225 |
| 7,099,169 B2 * | 8/2006 | West et al. .............. 363/132 |
| 7,161,331 B2 * | 1/2007 | Wai et al. ................ 323/222 |
| 2005/0113986 A1 * | 5/2005 | Prakash et al. .......... 701/13 |
| 2007/0216390 A1 * | 9/2007 | Wai et al. ................ 323/351 |

* cited by examiner

*Primary Examiner*—Bao Q Vu

(57) ABSTRACT

The present invention focuses on the development of a high-performance solar photovoltaic (PV) energy conversion system. The power circuit of the invention is made of a two-stage circuit, connecting a step-up DC-DC converter and a full-bridge inverter in serial. The present invention uses an adaptive perturbation and observation method to increase tracking speed of maximum power position and at the same time reduces energy loss. In addition, the full-bridge inverter's output has to have the same phase with the utility power in order to achieve unit power factor and increase the system efficiency. The present invention uses voltage type current control full-bridge inverter to achieve the goal of merging into utility grid. The present invention provides an active Sun tracking system, by utilizing the character of changing in open circuit output voltage with Sun radiation strength to follow the Sun, and decreases the system cost and increases system effectiveness.

4 Claims, 33 Drawing Sheets

HIGH-PERFORMANCE SOLAR PHOTOVOLTAIC (PV) ENERGY CONVERSION SYSTEM

BACKGROUND OF THE INVENTION

1. Field of the Invention

The present invention is related to automatic control, electronics, DC-DC conversion, DC-AC conversion and energy technology, specifically, solar photovoltaic (PV) energy conversion system being used in power grid.

2. Description of the Prior Art

Advance in science and technology has brought many conveniences in daily lives, and at the same time various problems, such as, reduction in the mount of fossil fuel, causing higher price and energy crisis; new energy source development becomes increasingly important. New energy source has less impact on environment and less pollution to the air and water. More importantly, these kinds of energy are reusable and inexhaustible. Renewable energy includes solar energy, wind, thermal energy, ocean and water energy etc [1, 2]. Solar power becomes heated research area due to its cleanness and readily available and many configurations have been developed. Solar energy conversion system parallel connected to utility-power grid uses solar panels to convert solar energy to DC current, then uses power conditioner to convert DC to AC, which is fed into utility-power grid [3,4]. The system usually includes DC input source, power conditioner, distribution box, transformer and rechargeable batteries. The power conditioner is consist of DC/DC converter, DC/AC inverter and system controller, and may vary depending on different applications. Because output voltage of a solar panel is relatively low, conventional method uses series connection to form required output voltage on DC bus bar. However, the voltage can be easily affected by varying load, making it difficult to design subsequent stage inverter and degrading power quality. Furthermore, if one module in the series does not work in optimum condition, the whole system's efficiency will be suffered. Therefore, two-stage conversion method is usually used to achieve AC power output, first using DC/DC converter to boosting input voltage and then using DC/AC inverter to output AC voltage.

Conventional DC/DC step-up circuit utilizes a boost converter with a single inductor; power semiconductor switches in the circuit have to bear high voltage, large current and reverse recovery current spike in output diode; this decreases conversion efficiency and limits boost ratio to seven times ratio. Also, by using transformer to boost voltage, winding ratio will limit boosting range; if leakage induction is not effectively dealt with, conversion efficiency will suffer. To solve the problem, the present invention utilizes a conversion circuit using bi-directional induction energy transfer proposed in reference [7]; it has high boost ratio and fair conversion efficiency, up to thirty times DC/DC power conversion.

To stabilize power output from solar energy system, the present invention controls the inverter by a microprocessor. To solve control problem, due to parameters changing and various undeterminable conditions, variety control theories have been proposed, such as Proportional-Integral-Derivative (PID)[8], Computed Torque Control, Sliding-Mode Control) [9, 10]. PID is widely used in the industry due to its simple in structure, easy to design and low cost; however, for a system with uncertain dynamic state, PID cannot provide effective solution. Computed Torque Control obtains linear equation by eliminating part or all non-linear factors in the non-linear equation, and then a linear feedback controller is designed to have a character of closed-loop control. Since the Computed Torque Control is based on idealization in eliminating non-linear dynamic state, it does not fully understand system's uncertain variables in the time domain, including changes in system parameters and external disturbances. Hence, larger boost gain is chosen in order to achieve desired strength and to guarantee stability.

The variable Structure Control or Sliding-Mode Control is one of effective non-linear control method [9-18], since under the Sliding-Mode Control controlled system states are not affected by the system uncertain variables and disturbances. The design of a Sliding-Mode Control system can be accomplished in two steps. First, the sliding plain in state variable space is chosen based on a required close-loop control; then the control rules are designed to make system state moving to and keeping on the sliding plain. At the beginning, the condition of system state locus touching the sliding plain is called the Reaching Phase; once the system state locus reaches the sliding plain, the system state will be kept on the plain and moving to a target point; this condition is call a Sliding Phase. When the system state is in the Reaching Phase, it is still affected by the changes of system parameters and external disturbances. Many design methods for Reaching Phase or Total Sliding-Mode Control are proposed to reduce the impact from system uncertain variables [12-15]. Study on special reaching rules is done by Gao and Hung [12] to explain the system state at a reaching phase; however, under this condition, system uncertain variables still affect system control capability. A Total Sliding-Mode Control [13-15] does not have reaching phase in control process and all the states are on the sliding plain; all control process is not affected by the system uncertain variables, but it still may cause vibration in control power and induce unstable state in the system. Few years ago, the Boundary Layer concept is used to eliminate the vibration phenomena in control power; however, if an improper width of boundary layer is chosen, the system can become unstable. Therefore, adaptive calculation [18], which can estimate uncertain variables, is used to reduce vibration phenomena and the present invention also adapts the method in all-bridge inverter.

Output from a solar panel will vary greatly depending on the strength of Sunlight. Fixed panel cannot absorb maximum solar energy throughout a day and the effectiveness of a solar energy conversion system will be limited. Recently, great emphasize has been made on Sun tracking system. A conventional Sun tracking system uses photo sensors mounted on both ends of the solar panel, and when the radiation measured by the sensors are equal, the solar panel is directed straight to the Sun; however, the sensors are not easy to be tuned and have limited life span. Therefore, the present invention proposes an active Sun tracking system, utilizing that open voltage from the solar panel is proportional to the strength of radiation, to track the Sun and to overcome the drawback of the conventional tracking system.

Relationships between the output voltage, the current and the power of a solar panel are non-linear. Radiation strengths, temperatures, deterioration of components and sensing materials will all influence output power of the solar panel. For different conditions, each has an unique working curve; each curve has a maxim power point and this point is the optimal position for the solar panel. To maximize utilization of a solar panel, a proper design for controlling is required in order to absorb maximum solar energy under various working environments. The method is so-called maximum power point tracking method [22-25], such as, the Power Feedback Method, the Incremental Conductance Method, the Linear Approximation Method, the Practical Measurement Method and the Perturbation and Observation Method. The Perturbation and Observation Method is the most popular method due to its simplicity, but it can cause energy loss due to difficulty in balancing the response time and the energy loss. Therefore, the present invention proposes an adaptive step disturbance method to overcame the drawback of the Perturbation and Observation Method, and to speed up maximum power point tracking and reduce energy loss.

References

[1] S. R. Bull, "Renewable energy today and tomorrow," Proc. IEEE, vol. 89, no. 8, pp. 1216-1226, 2001.

[2] S. Rahman, "Green power: what is it and where can we find it?," IEEE Power Energy Mag., vol. 1, no. 1, pp. 30-37, 2003.

[3] C. Yang and K. M. Smedley, "A cost-effective single-stage inverter with maximum power point tracking," IEEE Trans. Energy Conversion, vol. 19, no. 5, pp. 1289-1294, 2004.

[4] B. M. T. Ho and S. H. Chung, "An integrated inverter with maximum power tracking for grid-connected PV systems," IEEE Trans. Energy Conversion, vol. 20, no. 4, pp. 953-962, 2005.

[5] T. F. Wu, C. H. Chang, and Y. H. Chen, "A fuzzy-logic-controlled single-stage converter for PV-powered lighting system applications," IEEE Trans. Ind. Electron., vol. 47, no. 2, pp. 287-296, 2000.

[6] T. J. Liang, Y. C. Kuo, and J. F Chen, "Single-stage photovoltaic energy conversion system," IEE Proc. Electr. Power Appl., vol. 148, no. 4, pp. 339-344, 2001.

[7] R. J. Wai and R. Y. Duan, "High step-up converter with coupled-inductor," IEEE Trans. Power Electron., vol. 20, no. 5, pp. 1025-1035, 2005.

[8] K. J. Astrom and T. Hagglund, PID Controller: Theory, Design, and Tuning. Research Triangle Park, NC: ISA, 1995.

[9] K. K. Shyu, Y. W. Tsai, and C. K. ai, "Sliding mode control for mismatched uncertain systems," Electronic Letters, vol. 34, no. 24, pp. 2359-2360, 1998.

[10] K. K. Shyu, Y. W. Tsai, and C. K. Lai, "Stability regions estimation for mismatched uncertain variable structure systems with bounded controllers," Electronic Letters, vol. 35, no. 16, pp. 1388-1390, 1999.

[11] V. I. Utkin, "Sliding mode control design principles and applications to electric drives," IEEE Trans. Ind. Electron., vol. 40, no. 1, pp. 23-36, 1993.

[12] W. Gao and J. C. Hung, "Variable structure control for nonlinear systems: a new approach," IEEE Tran. Ind. Electron., vol. 40, no. 1, pp. 2-22, 1993.

[13] J. C. Hung, "Total invariant VSC for linear and nonlinear systems," A seminar given at Harbin Institute of Technology, Harbin, China, December 1996; Hunan University Changsha, China, December 1996.

[14] K. K. Shyu and J. C. Hung, "Totally invariant variable structure control systems," IEEE Conf. Ind. Electron. Contr. Instrument., vol. 3, pp. 1119-1123, 1997.

[15] K. K. Shyu, J. Y. Hung, and J. C. Hung, "Total sliding mode trajectory control of robotic manipulators," IEEE Conf. Ind. Electron. Contr. Instrument., vol. 3, pp. 1062-1066, 1999.

[16] J. J. E. Slotine and W. Li, Applied Nonlinear Control. Englewood Cliffs, N.J.: Prentice-Hall, 1991.

[17] k. J. Astrom and B. Wittenmark, Adaptive Control. New York: Addison-Wesley, 1995.

[18] R. J. Wai and K. M. Lin, "Robust decoupled control of direct field-oriented induction motor drive," IEEE Trans. Ind. Electron., vol. 52, no. 3, pp. 837-854, 2005.

[19] B. Koyuncu and K. Balasubramanian, "A microprocessor controlled automatic Sun tracker," IEEE Trans. Consumer Electron., vol. 37, no. 4, pp. 913-917, 1991.

[20] A. Ferriere and B. Rivoire, "An instrument for measuring concentrated solar-radiation: a photo-sensor interfaced with an integrating sphere," Sol. Energy, vol. 72, no. 3, pp. 187-193, 2002.

[21] J. D. Garrison, "A program for calculation of solar energy collection by fixed and tracking collectors," Sol. Energy, vol. 72, no. 4, pp. 241-255, 2002.

[22] C. Hua, J. Lin, and C. Shen, "Implementation of a DSP-controlled photovoltaic system with peak power tracking," IEEE Trans. Ind. Electron., vol. 45, no. 1, pp. 99-107, 1998.

[23] Y. H. Lim and D. C. Hamill, "Simple maximum power point tracker for photovoltaic arrays," Electronics Letters, vol. 36, no. 11, pp. 997-999, 2000.

[24] E. Koutroulis, K. Kalaitzakis, and N. C. Voulgaris, "Development of a microcontroller-based, photovoltaic maximum power point tracking control system," IEEE Trans. Power Electron., vol. 16, no. 1, pp. 46-54, 2001.

[25] M. A. S. Masoum, H. Dehbonei, and E. F. Fuchs, "Theoretical and experimental analyses of photovoltaic systems with voltage- and current-based maximum power-point tracking," IEEE Trans. Energy Conversion, vol. 17, no. 4, pp. 514-522, 2002.

SUMMARY OF THE INVENTION

The overall structure of a high performance solar energy conversion system proposed by the present invention is shown in FIG. 1. The solar panel 10 absorbs solar energy, and after the photovoltaic conversion output DC voltage $V_{pv}$ is fed into the high boost ratio DC/DC converter 20; the structure of the high boost ratio DC/DC converter 20 is shown in FIG. 2. When the power semiconductor switch Q of the first winding circuit 202 is turned on, the DC voltage $V_{pv}$ of the input circuit 201 will store energy in the first winding $L_1$ of the coupling inductor $T_r$; at the same time, because the bi-directional current passage of the second winding $L_2$ of the coupling inductor $T_r$ of the second winding circuit 204, it's coupled the voltage $v_{L_2}$ (is positive at the moment), plus the voltage of clamping capacitor $C_1$ of the passive regenerative snubber circuit 203, through the power semiconductor switch Q and the discharging diode $D_2$, the charge high voltage capacitor $C_2$ (charging current is $-i_{L_2}$). The moment the power semiconductor switch Q is turned off, the current of the first winding circuit 202 leaves the power semiconductor switch Q and flow through the clamping diode $D_1$ of the passive regenerative snubber circuit 203 into the clamping capacitor $C_1$ of the circuit. The current $i_{L_2}$ of the second winding circuit 204 has to flow through the clamping diode $D_1$ and the discharging diode $D_2$, to release energy stored by leakage induction of the second winding $L_2$ of the coupling inductor $T_r$; and the high voltage capacitor $C_2$ absorbs the energy; after releasing induction energy of the second winding $L_2$, according to the theorem that the magnetic flux does not extinguish, the first winding excited current will reverse the second winding current $i_{L_2}$, the rectifying diode $D_O$ of the filter circuit 205 is turned on and the current $i_{L_2}$ flows into the filter capacitor $C_O$ of the circuit 205, such that a stable DC voltage $V_d$ is obtained. This overcomes the drawback of the single-stage type solar energy conversion system in which the voltage on the DC bus bar is affected by the change of load; The circuit connects with the full bridge rectification circuit 30 and the DC voltage $V_d$ can be regarded as a fixed value, decoupling from the subsequent inverter, which simplifies design of the inverter control system.

Equation Deduction

Let the number ratio between of the first winding $L_1$ and the second winding $L_2$ of the coupling inductor $T_r$ be $n=N_2/N_1$, the coupling co-efficiency be defined as $$k = \frac{L_m}{L_k + L_m} \quad (1)$$

where $L_m$ is the excited induction (or coupled induction), $L_k$ is the leakage induction of the first winding; from circuit analysis, it can be shown the conversion circuit voltage gain and the voltage beard by the switch Q are as follows:

$$G_{V1} = \frac{V_d}{V_{pv}} = \frac{2+nk}{1-D} + \frac{D(1-k)(n-1)}{1-D} \quad (2)$$

$$v_{DS} = \frac{V_{pv}}{1-D} + \frac{D(1-k)(n-1)}{2(1-D)} V_{pv} \quad (3)$$

where D is the switch's duty cycle; let the coupling co-efficiency k be 1, equations (2) and (3) can be written as follows:

$$G_{V1} = \frac{V_d}{V_{pv}} = \frac{2+n}{1-D} \quad (4)$$

$$v_{DS} = V_{pv}/(1-D) \quad (5)$$

Substitute equation (5) into equation (4), the voltage on the switch is:

$$v_{DS}=V_d/(n+2) \quad (6)$$

From equation (6), let the output voltage $V_d$ and the winding ratio n be fixed, the voltage beard on the power semiconductor switch Q is not related to the Input voltage $V_{pv}$ and the duty cycle D; hence, the highest voltage beard by the power semiconductor switch is guaranteed to be a fixed number. As long as the input voltage is not higher than the voltage beard by the switch Q, the circuit designed according to equation (6), combined with the high voltage gain, can tolerate large range of the input voltage.

The full-bridge inverter 30 connected to the high voltage gain DC/DC conversion circuit 20 is used for the DC/AC conversion; the control unit 50 includes a microprocessor and the drive circuit 70; with a feedback control of the system state, the microprocessor 60 uses unipolar voltage switching of Sinusoidal Pulse-Width-Modulation (SPWM) to control the output driving signal, and through the inverter's drive circuit 70 to control four power diodes of the full-bridge inverter 30; the output is fed to the clamping inductor 40, which filters out the high frequency portions in the inverter's AC output and then the AC is supplied to the utility-power grid.

The decoupled system equivalent circuit is shown in FIG. 3. To simplify explanation, the circuit number (i.e. circuit 10) is omitted. $V_d$ is a DC bus voltage outputted by the high voltage gain DC/DC conversion circuit, $v_{AB}$ is an AC voltage with a high frequency portion after the full-bridge inverter and its high frequency portion can be filtered out by the clamping inductor $L_f$ to obtain an AC output current $i_o$; $r_{L_f}$ is an inner resistance of the clamping inductor, and the voltage source $v_d$ presents an interference voltage caused by load changing. To simplify the deduction process of a state space equation, assume (1) the inner resistance $L_f$ of the clamping inductor is very small and can be omitted; (2) the power switch is an idealized component, and the switching loss and the conducting loss are zero; (3) omit the switching time (i.e. the switch response time); (4) the switch's switching frequency is much higher than the system's natural frequency and adjustment frequency, and hence the control signal and the input/output voltage can be viewed as fixed during one switch's switching cycle.

Based on the above assumptions, the power switch's switching of width modulation of the unipolar sinusoidal wave is divided into a positive and a negative half cycle, and since other than in the negative half cycle $v_{AB}$ voltage is opposite to that in the positive half cycle, both working theory is the same. Therefore, following detail analysis only includes the positive half cycle. There are two states for the switch during the positive half cycle, and its equivalent circuit is shown in FIG. 4. For the positive half cycle, using the state space average method and the linearization, dynamic space equation of the positive half cycle can be represented as $$\dot{i}_o = \frac{1}{L_f}(V_d D_i - v_u - v_d) \quad (7)$$

where $i_o$ is the AC output current, $D_i$ is the conducting duty cycle of the switch $T_{A+}$ and $T_{B-}$ for each switching cycle. Define the duty cycle $D_i = v_{con}/\hat{v}_{tri}$ and the bridge power gain $K_{PWM} = V_d/\hat{v}_{tri}$, where $v_{con}$ is the sine control signal, $\hat{v}_{tri}$ is the peak of triangle wave signal, then the system dynamic model can be rewritten to equation (8), through the Laplace Transform the system equivalent model can be express as FIG. 5.

$$\dot{i}_o = \frac{K_{PWM}}{L_f} v_{con} - \frac{1}{L_f} v_u - \frac{1}{L_f} v_d \quad (8)$$

Select the AC output current $i_o$ as the system state and $v_{con}$ as the control variable, then equation (8) can be reorganized to $$\dot{x}_g(t) = d_p u(t) + e_p f(t) + g(t) \quad (9)$$
$$= (d_{pn} + \Delta d_{pn})u(t) + (e_{pn} + \Delta e_{pn})f(t) + g(t)$$
$$= d_{pn} u(t) + e_{pn} f(t) + h(t)$$

where $x_g(t)=i_o$, $u(t)=v_{con}$, $d_p=K_{PWM}/L_f$, $e_p=-1/L_f$, $f(t)=v_u$ and $g(t)=-v_d/L_f$; $d_{pn}$ and $e_{pn}$ represent the system parameters of $d_p$ and $e_p$ under normal condition respectively; $\Delta d_{pn}$ and $\Delta e_{pn}$ represent the disturbance in the system parameters; h(t) is the sum of the uncertain variables and is defined as $$h(t)=\Delta d_{pn}u(t)+\Delta e_{pn}f(t)+g(t) \quad (10)$$

where the boundary value of the sum of the uncertain variables is shown in equation (11), where $\rho_g$ is a positive number.

$$|h(t)|<\rho_g \quad (11)$$

For a full bridge inverter, in order to have its output current to effectively follow the current command and to synchronize with the utility-grid with same phase, i.e., to achieve the optimum efficiency, even when the uncertain variables and the outside interferences exist, the present invention uses the Adaptive Total Sliding-Mode Control (ATSMC) to control the output current of the inverter, as shown in FIG. 6. Define the control error $e_g = x_g - x_{gd} = i_o - i_{cmd}$, where $x_{gd} = i_{cmd}$ is the output current command, let the design sliding plain $s_g(t)$ as $$s_g(t) = e_g(t) = e_g(0) + \alpha \int_0^t e_g(\tau) d\tau \quad (12)$$

where $\alpha$ a positive number and $e_g(0)$ is an initial value of $e_g(t)$.

The adaptive Total Sliding-Mode Control (ATSMC) consists mainly of three parts: the first part is the system performance planning, the method is to obtain system effectiveness under a planned normal condition, and it belongs to the Baseline Model Design $u_b$; the second part is the Curbing Controller $u_c$, it eliminate inferences from changes of the system parameters and loads as well as unpredictability of the unmodeled system states, to achieve system effectiveness of the Baseline Model Design; the third part is to develop Adaptive Observation Design $\hat{\rho}$, and estimate the upper boundary of the sum of the uncertain variables in order to avoid the vibration phenomena in control power due to an improper choice of the controller's upper boundary.

The overall control design of ATSMC is shown in Theorem, also, if the system subsequent DC/AC conversion mechanism is changed, the same deduction method can be used to complete the inverter control system design.

[Theorem 1]

Assume a full bridge inverter controlled by ATSMC as shown in equation (9), designs of each part of controller as shown in equation (13)-(15), and develop the Adaptive Observation Design as shown in equation (16), then the system stability will be guaranteed.

$$u = u_{gb} + u_{gc} \quad (13)$$

$$u_{gb} = -d_{pn}^{-1}(e_{pn}f + \alpha e_g - \dot{x}_{gd}) \quad (14)$$

$$u_{gb} = -\hat{\rho}_g(t) d_{pn}^{-1} sgn(s_g(t)) \quad (15)$$

$$\dot{\hat{\rho}}_g(t) = \frac{1}{\lambda_g} |s_g(t)| \quad (16)$$

where sgn(•) a sign function, |•| is an absolute function, $\lambda_g$ is a positive number.

[Proving]

According to analysis of the Lyapunov stability theory [16, 17], the stability of an inverter control system can be guaranteed; since the proving of Theorem 1 is basically the same as reference [1], it is omitted here.

Although Sun tracking can maximize radiation on a solar penal and improve the system efficiency but difficult to implement, such as, the sensing technique, the elimination of external interferences, the reliability and the cost. Commonly used Sun tracking method mounts the photo sensor on both sides of the solar panel and by adjusting the angle of the panel until signals by a driving device 80 from both sides are equal, the panel is directly facing the Sun. However, adjustment of photo sensing device is not easy and sensor's character changes through aging. The present invention proposes a Sun tracking system, which utilizes the fact that open circuit voltage of a solar panel is proportional to radiation strength of the Sun, and by adjusting angle of the panel and measuring the open circuit voltage, the microprocessor can determine if the panel is facing the Sun and send corresponding control signal. The method only use open circuit voltage of a solar panel to track position of the Sun, and since the Sun moves slowly, ascending angle is unchanged in a month and total change is less than ±10° in a year, the tracking system does not need to change tilting angle, and a single axis position control can accomplish the purpose of collecting maximum radiation. The control process is shown in FIG. 7, where $V_{oc}[n]$ and $V_{oc}[n-1]$ are current and previous open circuit voltage; $\Delta V_{oc}$ is the changing size of the open circuit voltage; during a day the Sun only moves from East to West, the process starts with clock wise and one degree per $t_r$ the second speed rotation to vary the open circuit voltage and to determine if continue to rotate in order to maximize the radiation reception; if over rotation or outside environment change(tree shadow) cause the open circuit voltage decrease, the system will rotated back to the previous position and wait $t_w$ second before resume tracking.

For the conventional maximum power tracking method, the Perturbation and Observation Method is widely used due to its simplicity and no need for using system parameters; however, the perturbation quantity is not easy to chose, and a larger perturbation quantity can improve the response speed but the perturbation will not stop even when the solar panel reaches a maximum power output; the perturbation around the maximum power point will causes an energy loss; a smaller step can be used to improve the perturbation, but when the temperature or the radiation drastically changes, the characteristic curve changes, and the maximum power point shifts, all cause a slow response in tracking the new maximum power point; it will cause energy loss too; therefore, it is a balancing act on the response time and the energy loss when choosing perturbation quantity. The present invention proposes an Adaptive Step-Perturbation Method, through the feedback of the output voltage and the current of the solar panel, the microprocessor can calculate varying quantities of the output voltage and power of the solar panel and adjust the perturbation steps based on their relationship according to the system condition; this will effective improves the conventional Perturbation and Observation Method, and speed up the maximum power point tracking and reduce the energy loss.

The control process for an Adaptive Step-Perturbation Method is shown in FIG. 8, where $I_{pv}[n] V_{pv}[n]$ and $P_{pv}[n]$ are the output current, the voltage and the power respectively; and $I_{pv}[n-1] V_{pv}[n-1]$ and $P_{pv}[n-1]$ are the previous output current, the voltage and the power respectively; $\Delta V_{pv}$ and $\Delta P_{pv}$ are the output voltage and the power changed sizes; $V_{ref}$ and $\Delta V_{ref}$ are the output voltage command and the perturbation step; $\beta$ is a positive gain. At the beginning, the output voltage and the current are obtained, and the output power and the output voltage changed size are calculated; the adaptive perturbation step $\Delta V_{ref} = \beta \Delta P_{pv} / \Delta V_{pv}$, and it can be seen that the perturbation step $\Delta V_{ref}$ is proportional to the tangent of the curve of the output voltage to the output power of the solar panel ($\Delta P_{pv} / \Delta V_{pv}$); that is the perturbation steps are adaptively adjusted along the changes of the system condition, and it can speed up the maximum power point tracking and reduce the energy loss. Once the solar panel voltage command $V_{ref}$ is obtained, using the voltage margin error $e_m = V_{ref} - V_{pv}$, through the proportional controller, the current magnitude command $i_{amp}$ can be produced; the indirectly controlled solar panel voltage is shown in FIG. 9, where $k_p$ is a positive number, $\Delta i_{amp}$ is changing size in inverter current command, $w_u = 2\pi f_u$, $f_u$ is the utility frequency; By multiplying the current magnitude command $i_{amp}$ of the inverter of the maximum power tracking with the sinusoidal signal $\sin(w_u t)$ having the same phase as the utility-power grid, a complete current command $i_{cmd}$ is formed, and then handed to the ATSMC system designed by the present invention, to achieve the maximum power tracking and supply to the utility-power grid.

These features and advantages of the present invention will be fully understood and appreciated from the following detailed description of the accompanying Drawings.

BRIEF DESCRIPTION OF THE DRAWINGS

FIG. 22 is one embodiment of maximum power tracking system of the present invention, system response for adaptive step perturbation method: (a) relationship between output power, output voltage and input current; (b) temporal tracking locus; (c) stable locus.

DETAILED DESCRIPTION OF THE PREFERRED EMBODIMENT

One of embodiment of the high performance solar energy conversion system of the present invention uses a plurality of 6 F-MSN-75W-R-02 solar panels connected in parallel to provide a low voltage DC to the high boost gain DC/DC conversion circuit; under the standard test condition (1 kW/m$^2$, 25° C.), a single solar panel specified output power is 76.78 W, the specified output voltage is 17.228V, the specified output current is 4.4567 A, the open circuit voltage is 21.61V, the short circuit current is 4.9649 A and the photovoltaic conversion efficiency is 11.92%. Since the duty cycle of the switch Q of the high boost gain DC/DC conversion circuit is 0.5, the conducting currents of each circuit components have relative small harmonics, specially when the conduction switches are complementary components, the effect is more prominent. Also when the input voltage is around 17V the solar panel reaches a maximum power point and has near the optimum effectiveness, using equation (4) and let the specified output voltage be 200V, the winding ratio n be 4, from equation (6) it can be known that the highest clamping voltage of the switch is 34V. Even when lowest input voltage is 10V and output voltage is 200V, from equation (4), the duty cycle D is 0.7 at this time, it is an accepted value. The present invention assumes the switching frequency of the switch of the high boost gain DC/DC conversion circuit switch is 100 kHz, the same as common used by the industry for a high frequency switching, the detail circuit specification is as follows:

$V_d$: DC 200V $T_r$: $L_1$=9 µH; $L_2$=143 µH; $N_1$: $N_2$=3: 12; k=0.97; core: EE-55

Q: IRFP048N: 55V/64 A; $C_{IN}$: 3300 µF/50V*2

$C_1$: 6.8 µF/100V; $C_2$: 1 µF/250V*2; $C_O$: 47 µF/450V*2

Figure 1:
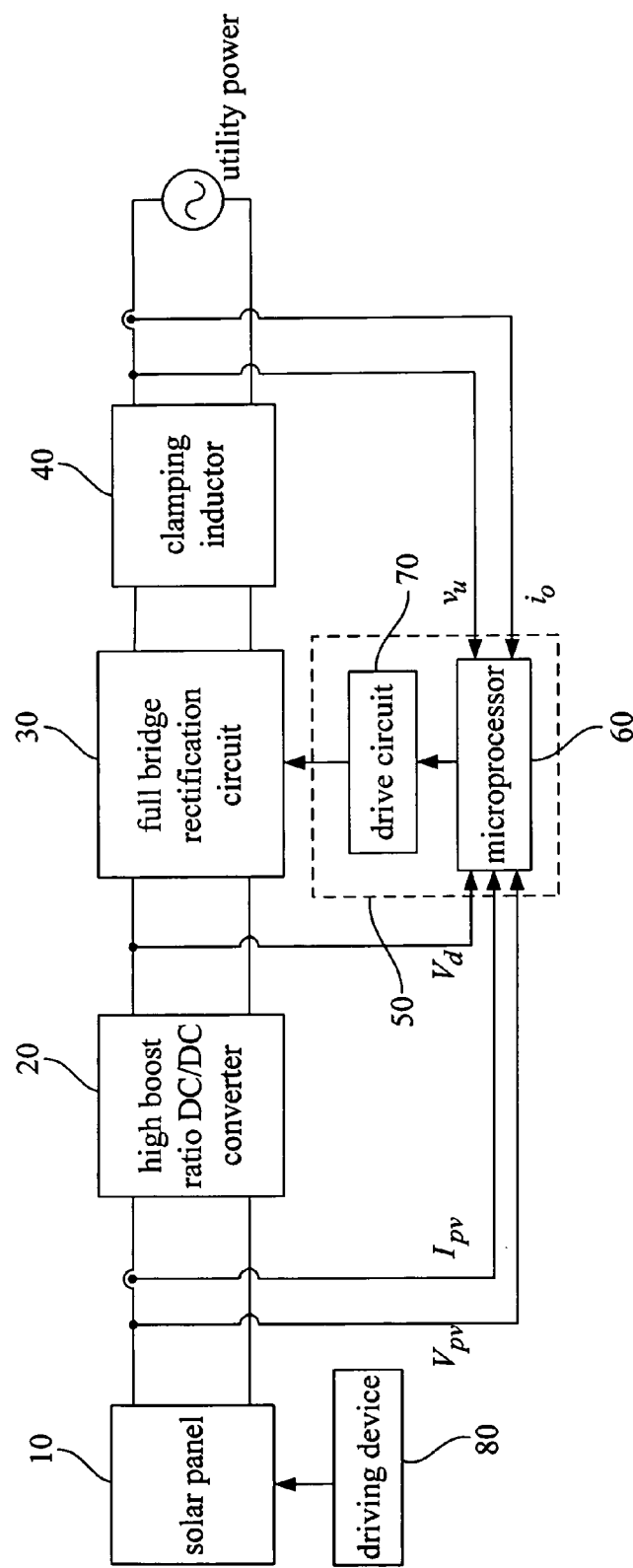
FIG. 1 is overall structure of a high performance solar energy conversion system of the present invention.
Figure 2:
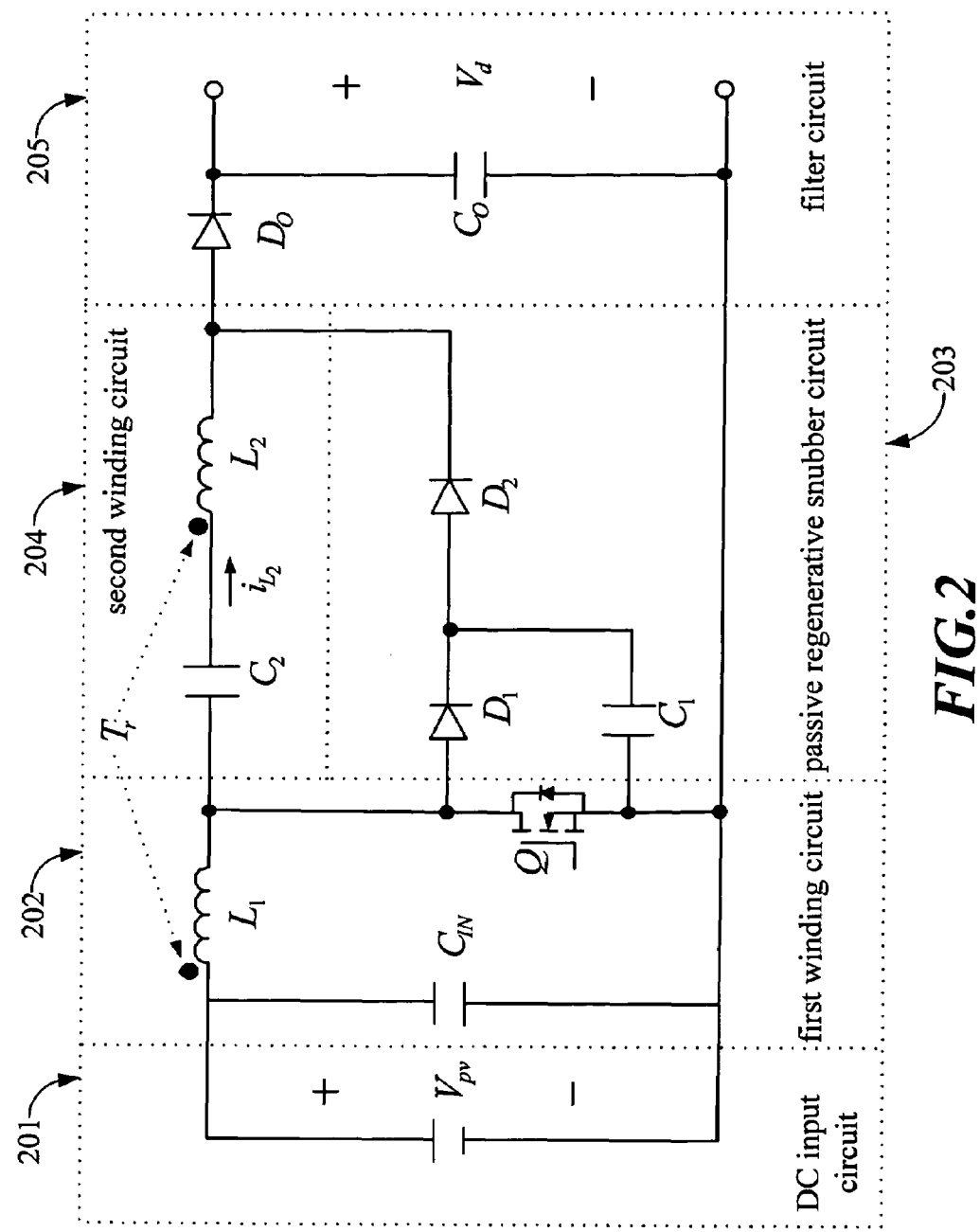
FIG. 2 is high boost ratio DC/DC conversion circuit of the present invention.
Figure 3:
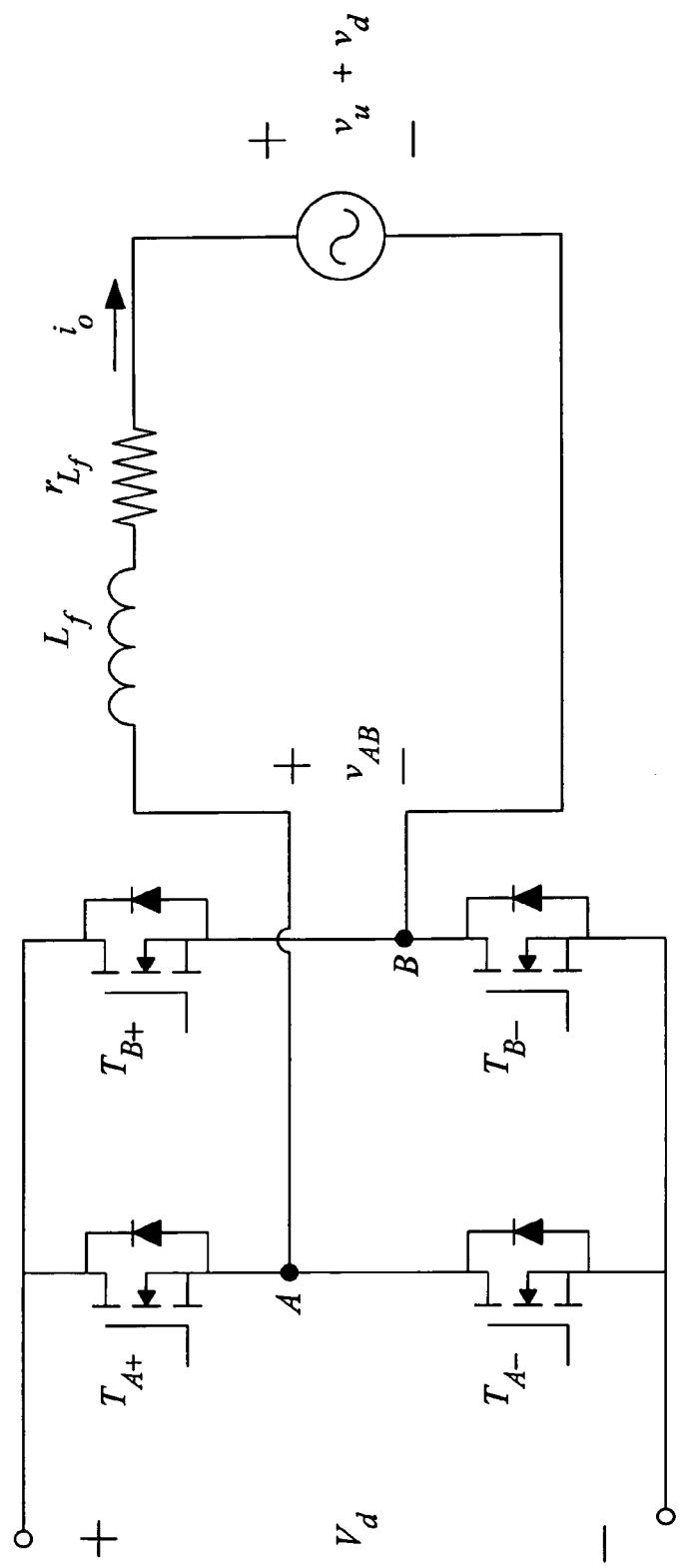
FIG. 3 is equivalent circuit of the present invention.
Figure 4A:
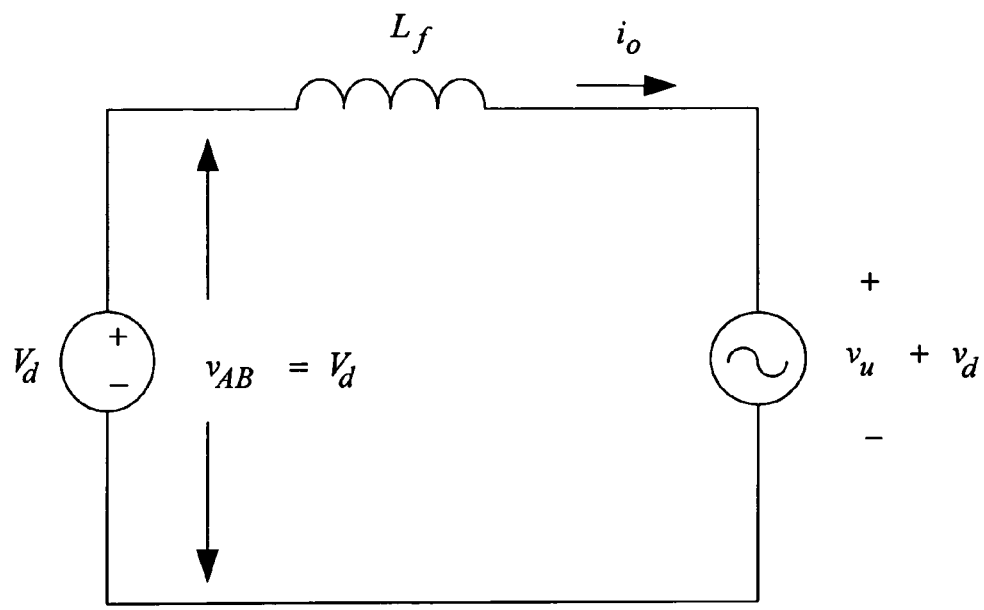
FIG. 4 shows two states of full bridge inverter during switching of positive half cycle: (a) $T_{A+}$ and $T_{B-}$ are conducting; (b) $T_{A+}$ and $T_{B+}$ are conducting or $T_{A-}$ and $T_{B-}$ are conducting.
Figure 4B:
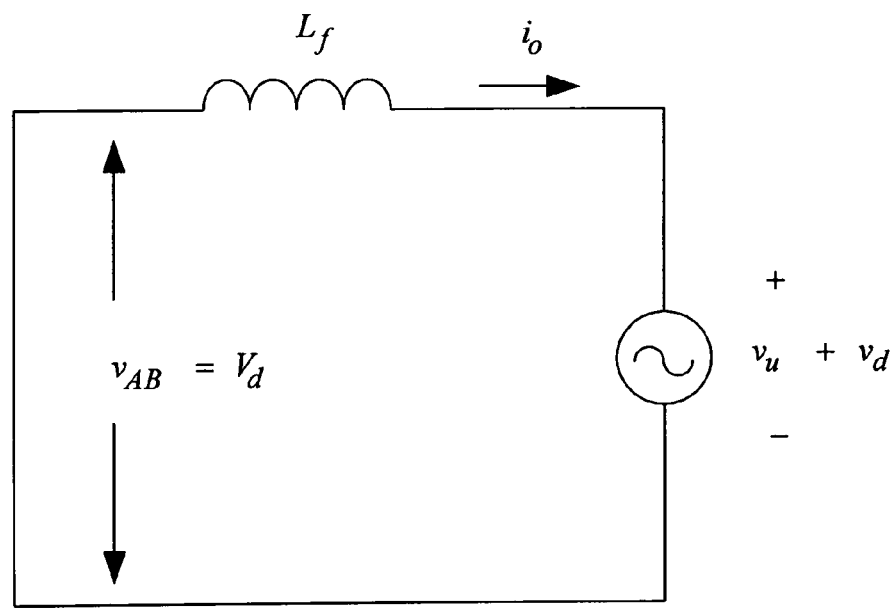
Figure 5:
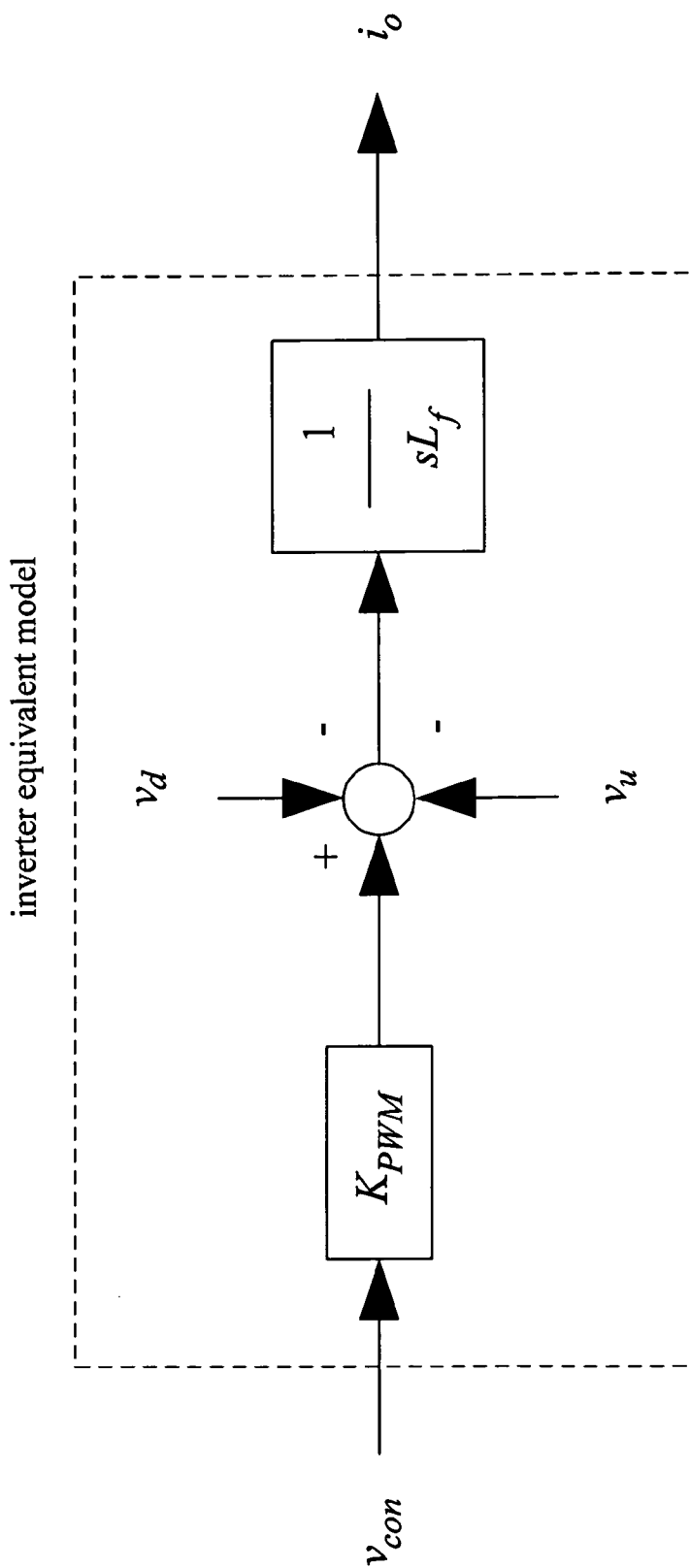
FIG. 5 is equivalent model for the inverter of the present invention.
Figure 6:
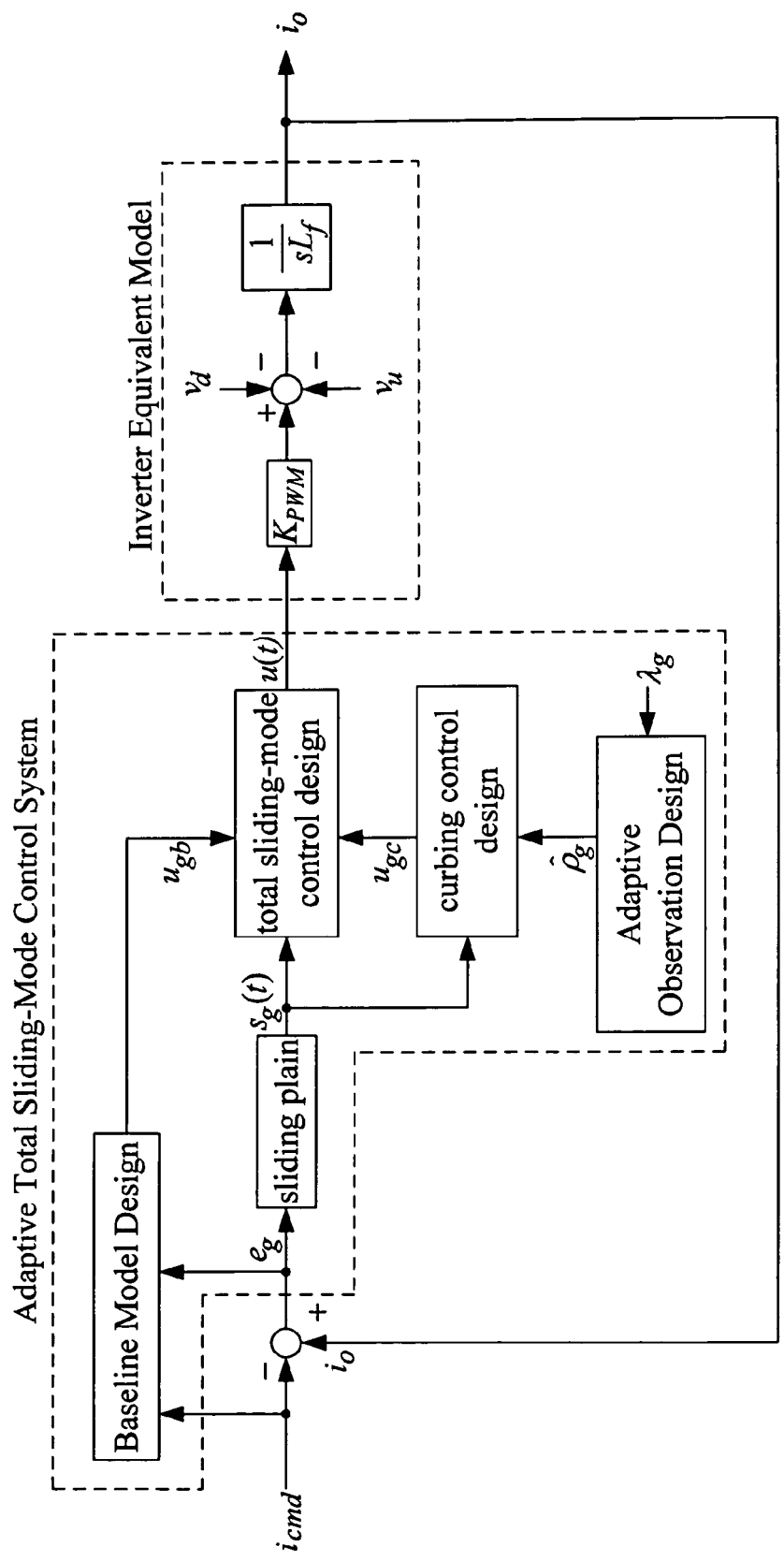
FIG. 6 is inverter control system of Adaptive Total Sliding-Mode Control.
Figure 7:
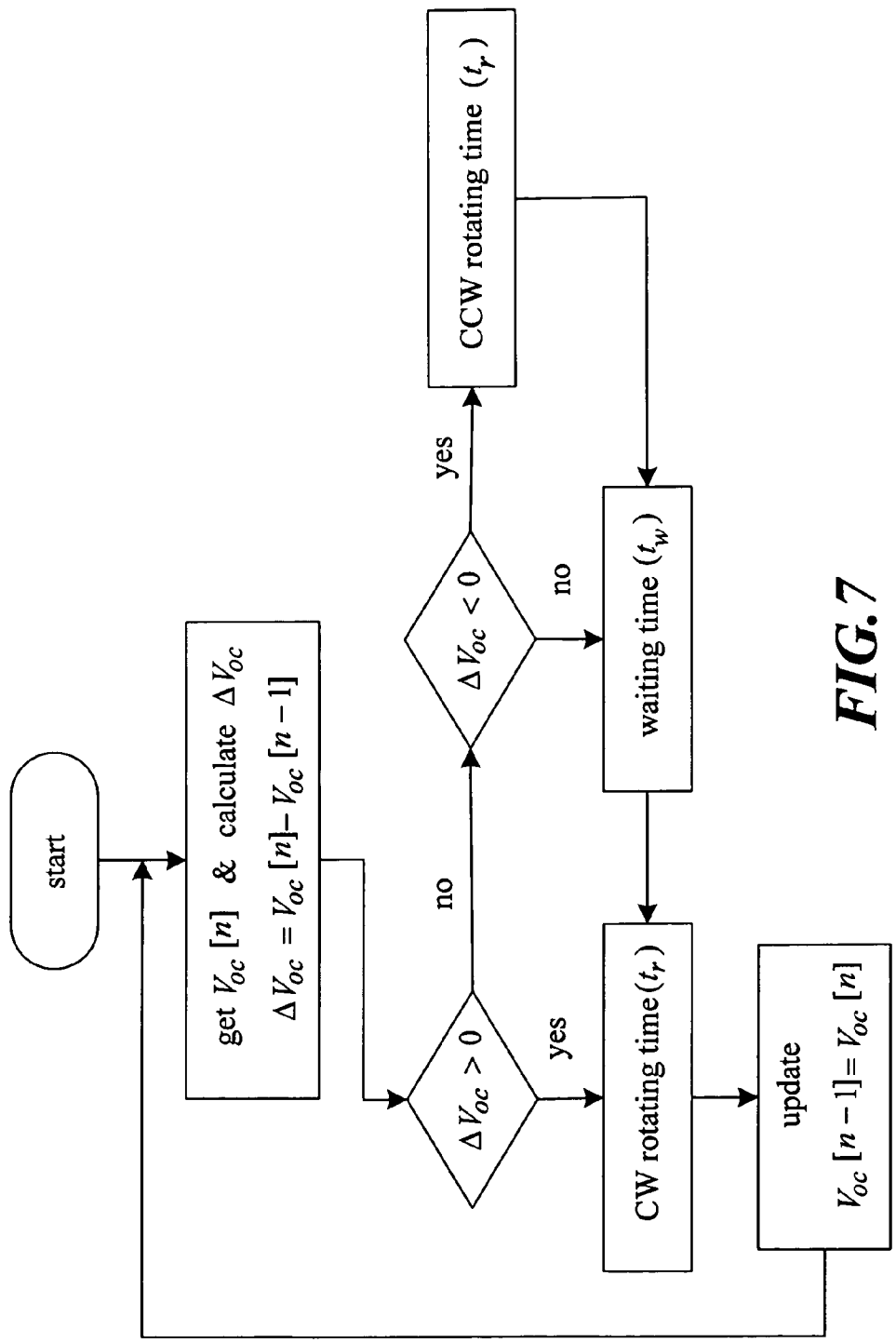
FIG. 7 is control flow of active Sun tracking system of the present invention.
Figure 8:
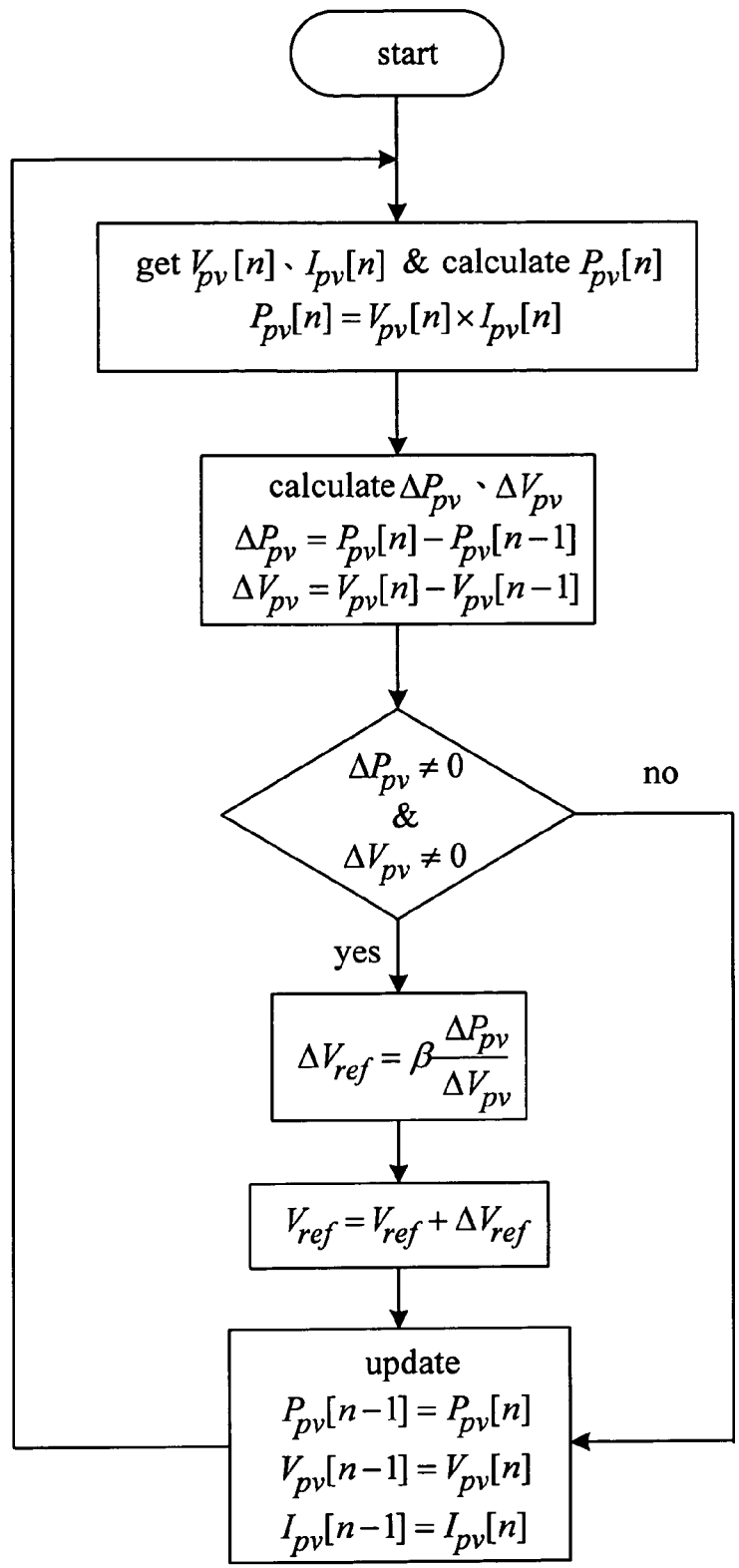
FIG. 8 is control process of adaptive step perturbation method of the present invention.
Figure 9:
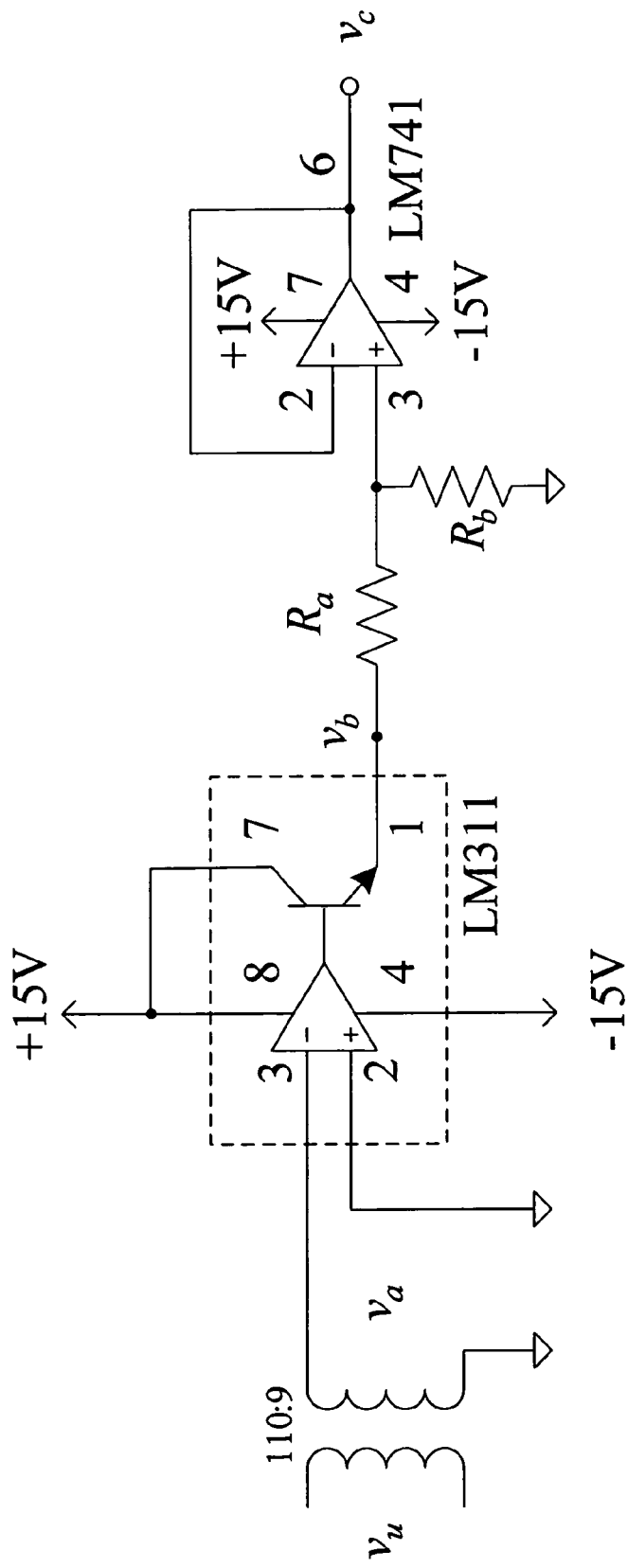
FIG. 9 is inverter magnitude command logic of the present invention.
Figure 10A:
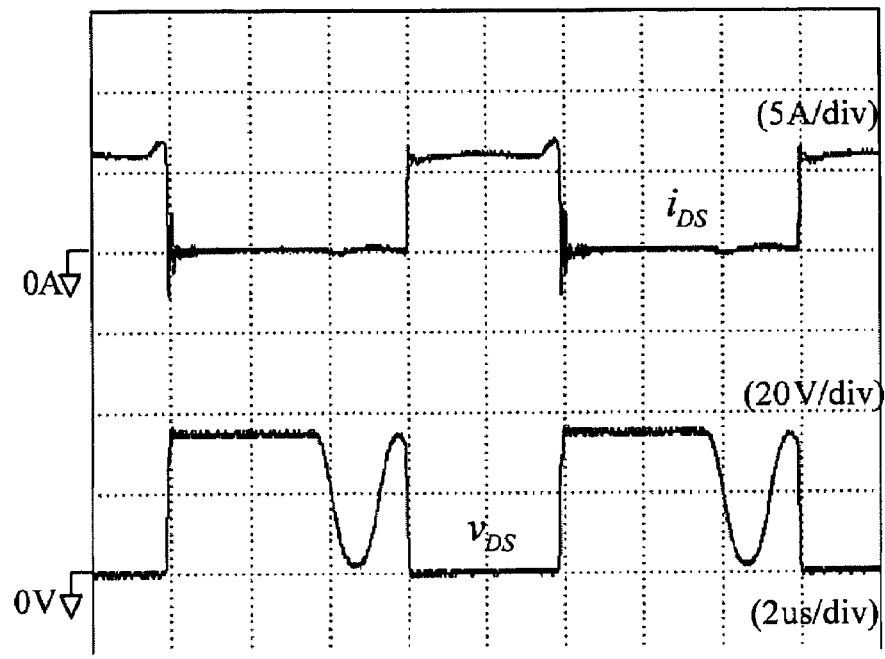
FIG. 10 is one embodiment of the DC/DC conversion circuit of the present invention, when voltage of solar panel reaches 200V and output power is 40 W, voltages and currents for each component.
Figure 10B:
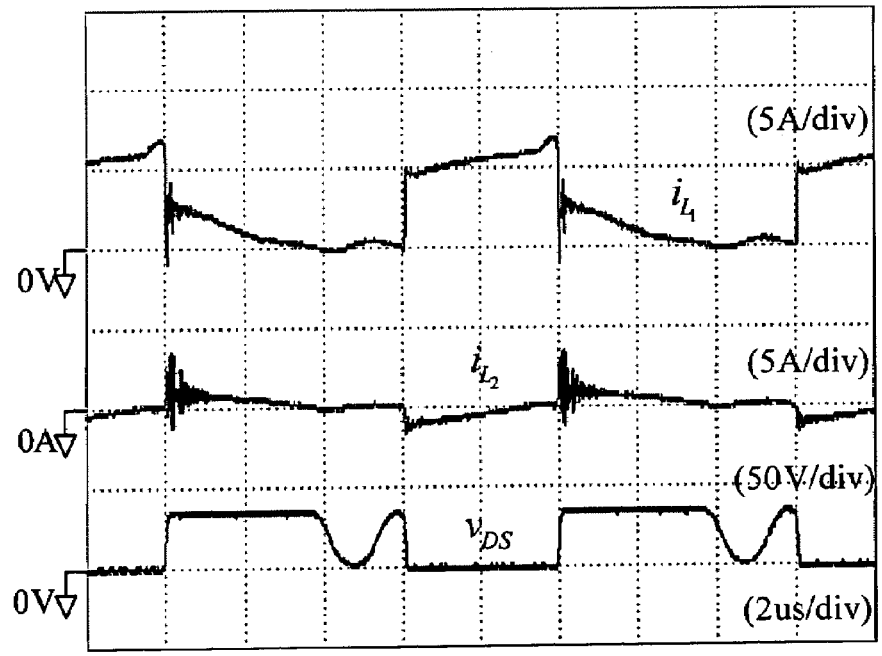
Figure 10C:
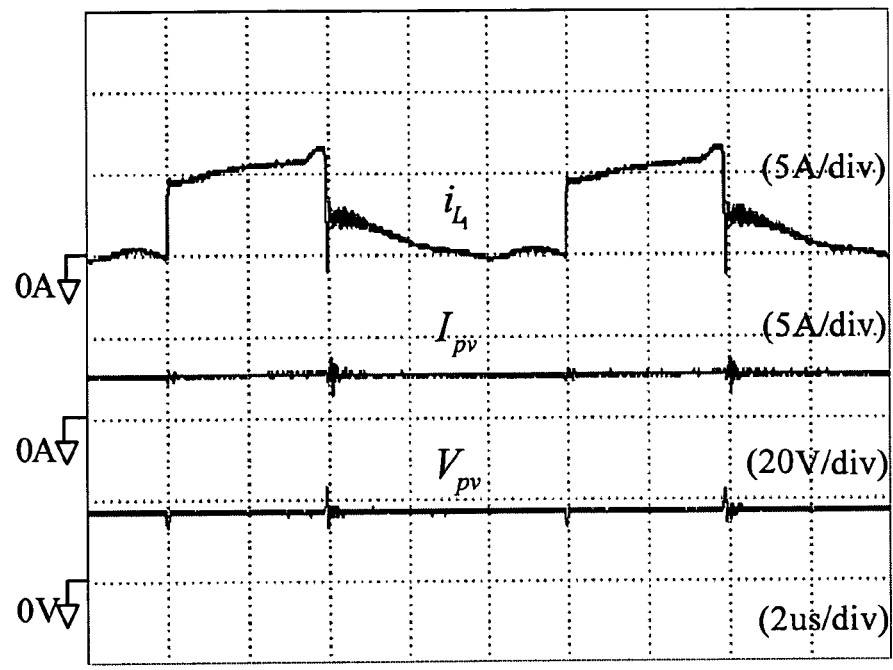
Figure 10D:
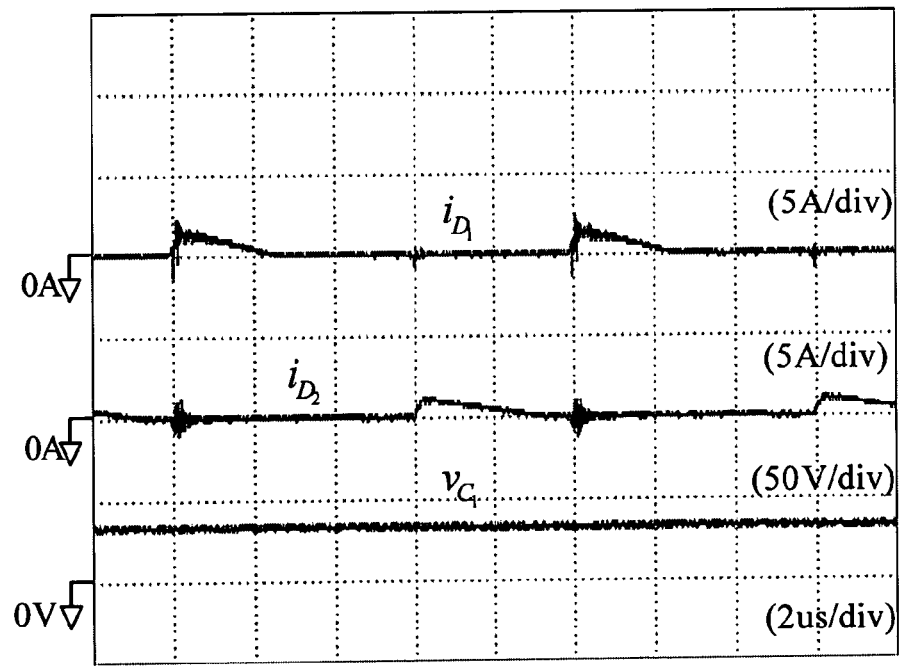
Figure 10E:
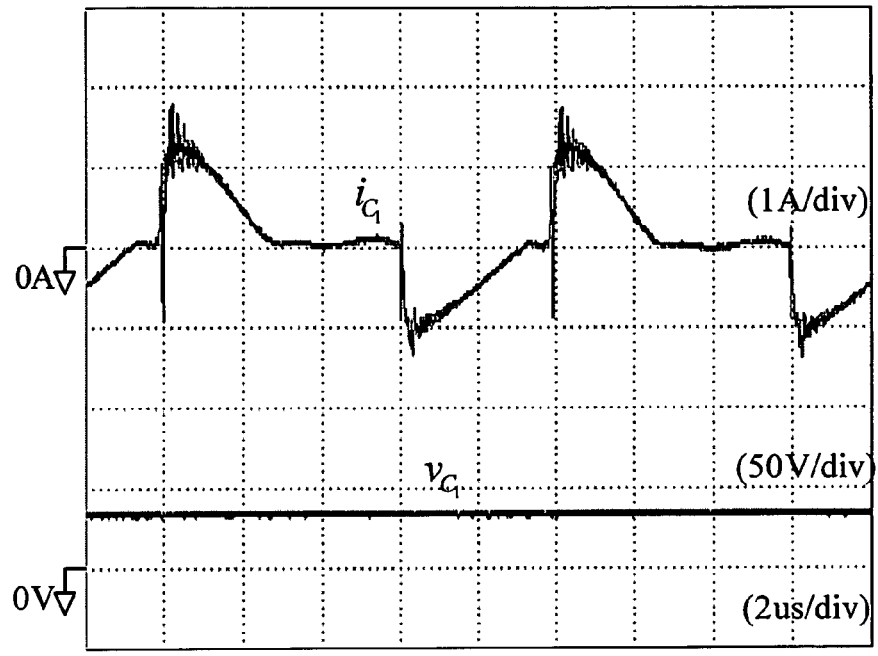
Figure 10F:
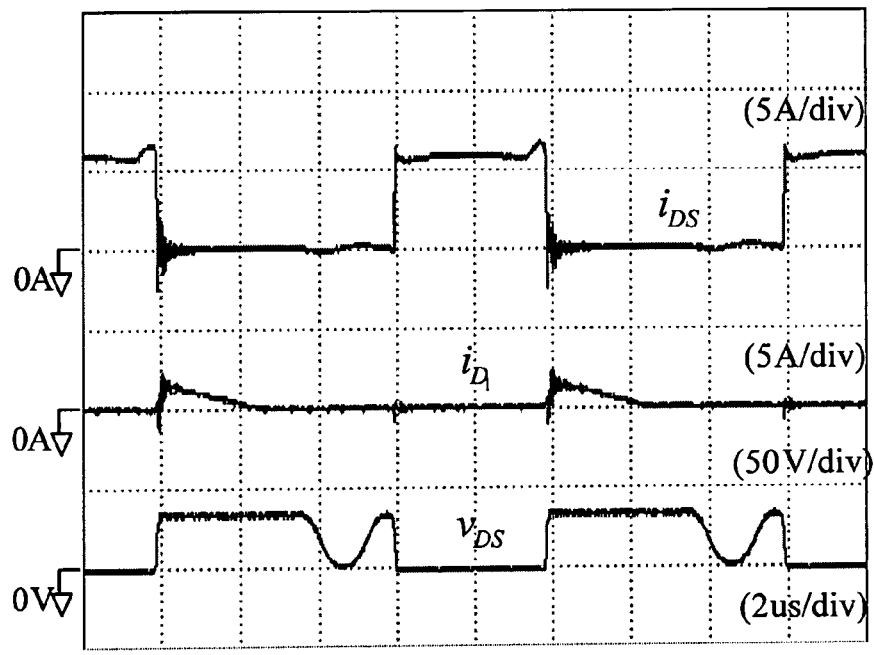
Figure 10G:
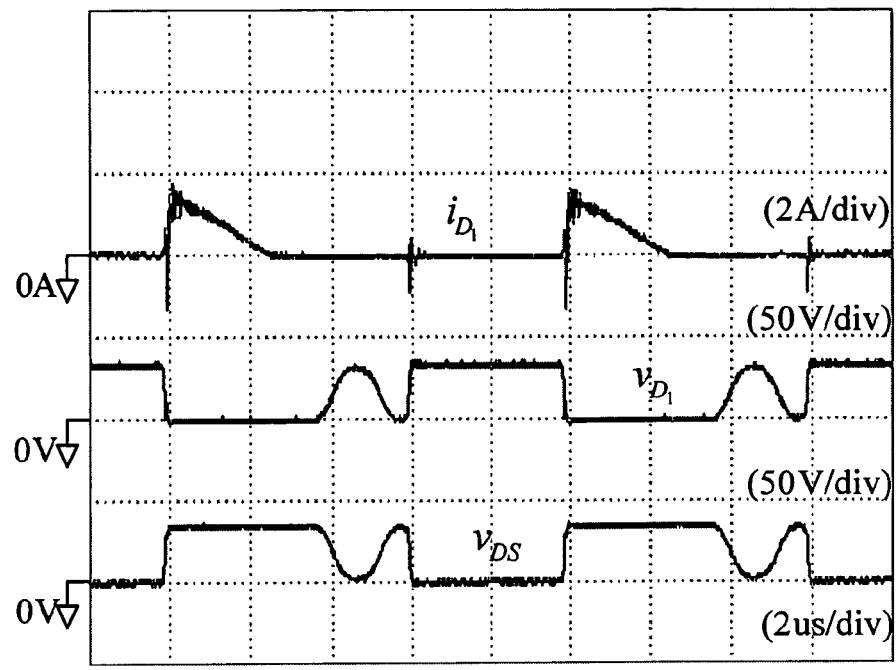
Figure 10H:
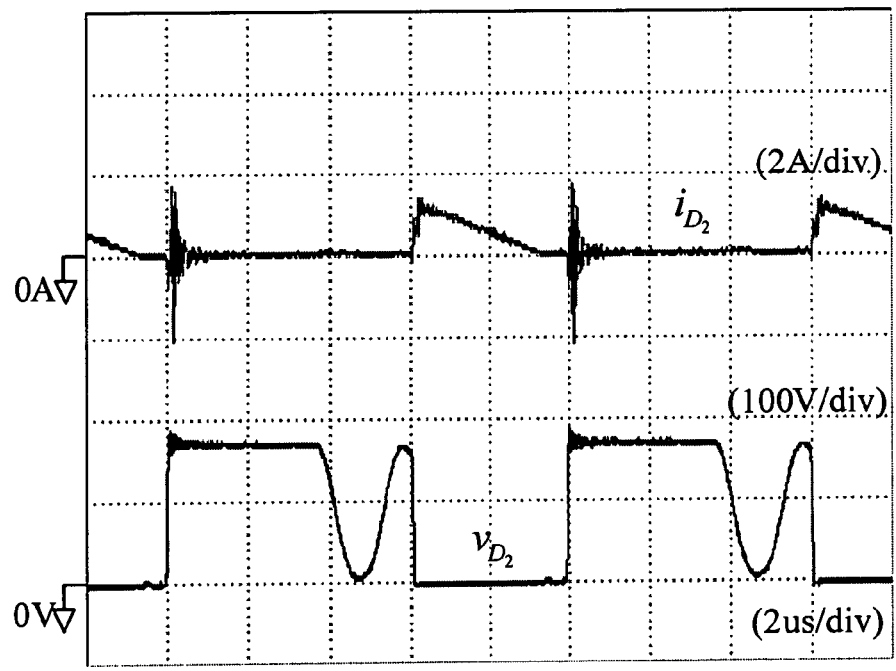
Figure 10I:
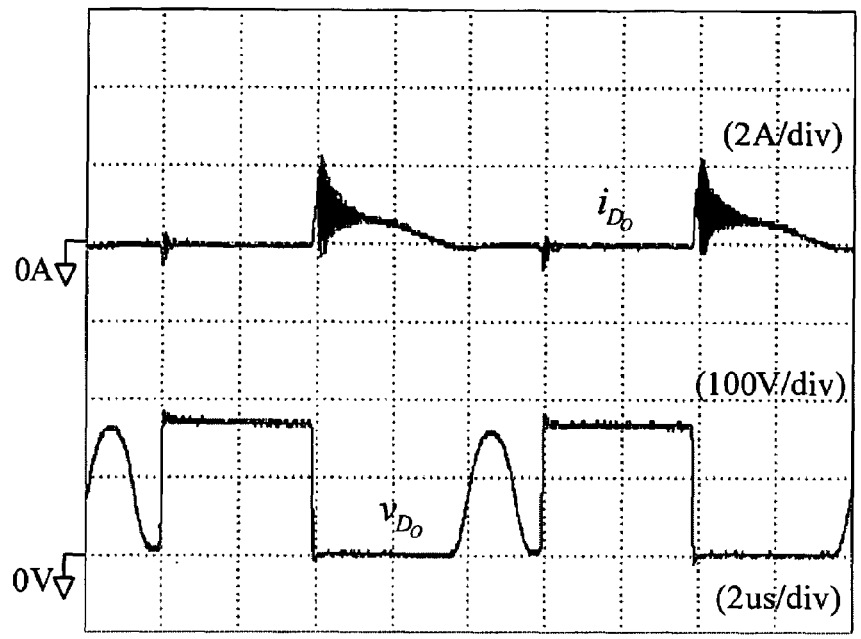
Figure 10J:
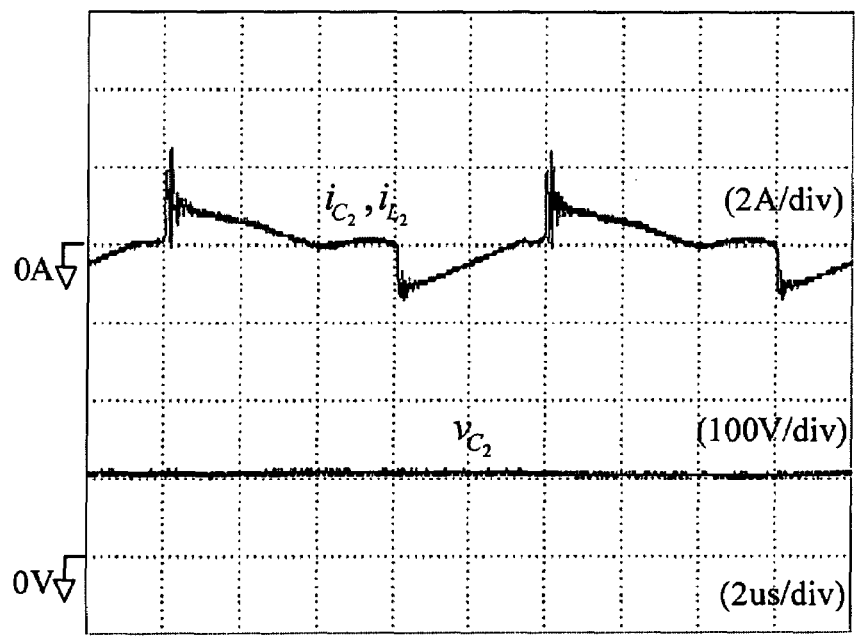
Figure 11A:
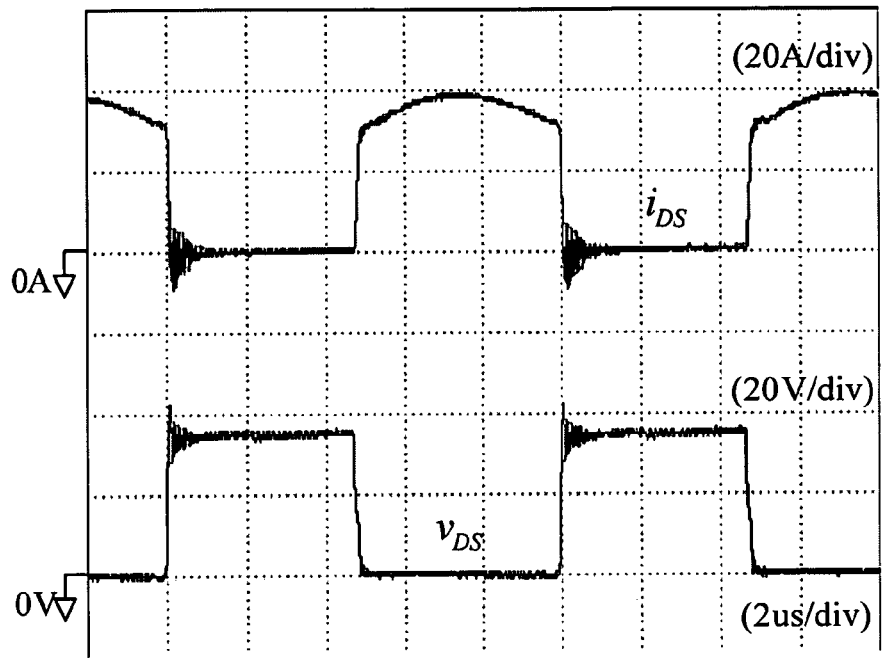
FIG. 11 is one embodiment of the DC/DC conversion circuit of the present invention, when voltage of solar panel reaches 200V and output power is 320 W, voltages and currents for each component.
Figure 11B:
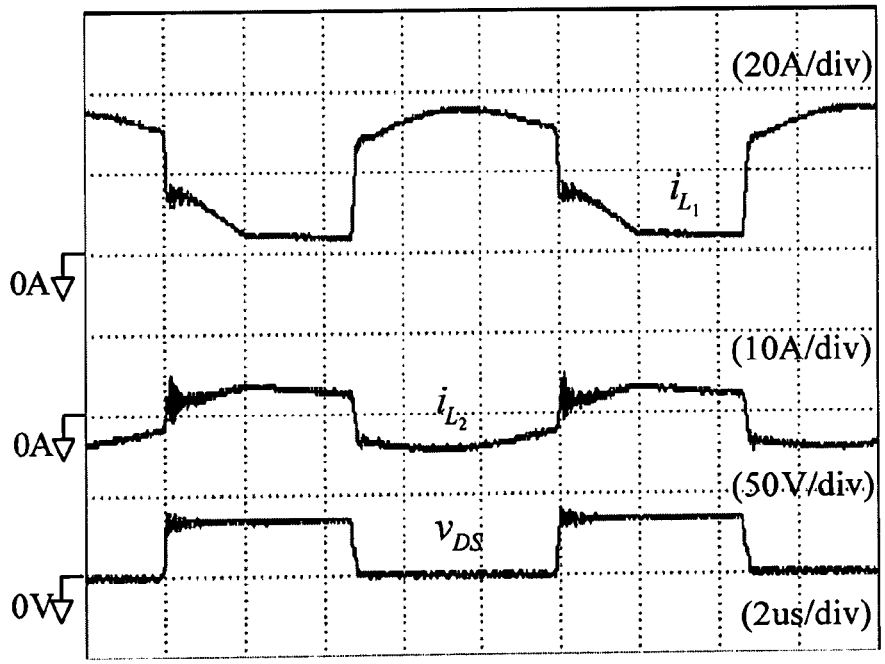
Figure 11C:
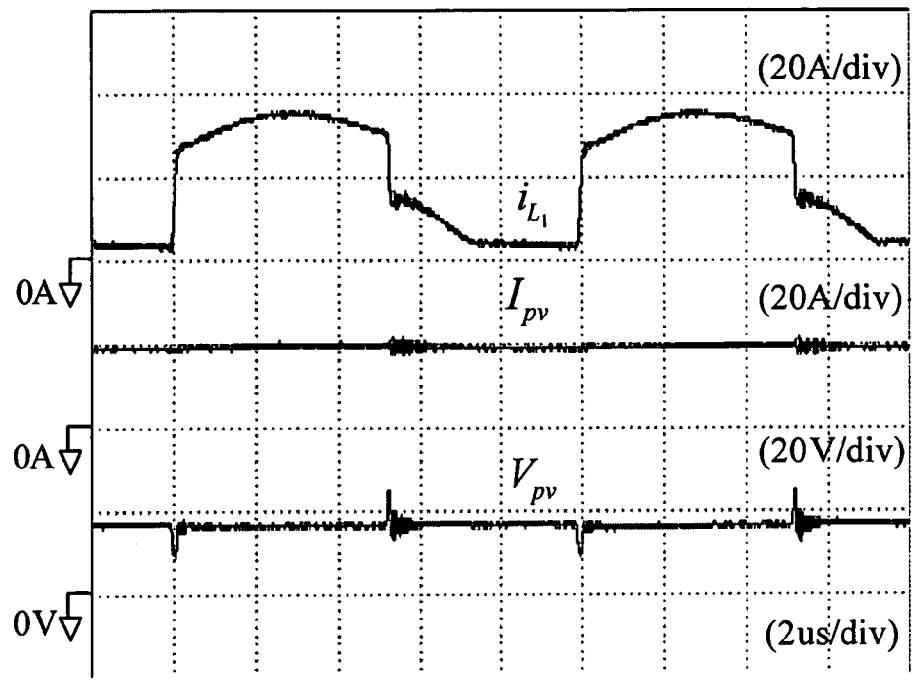
Figure 11D:
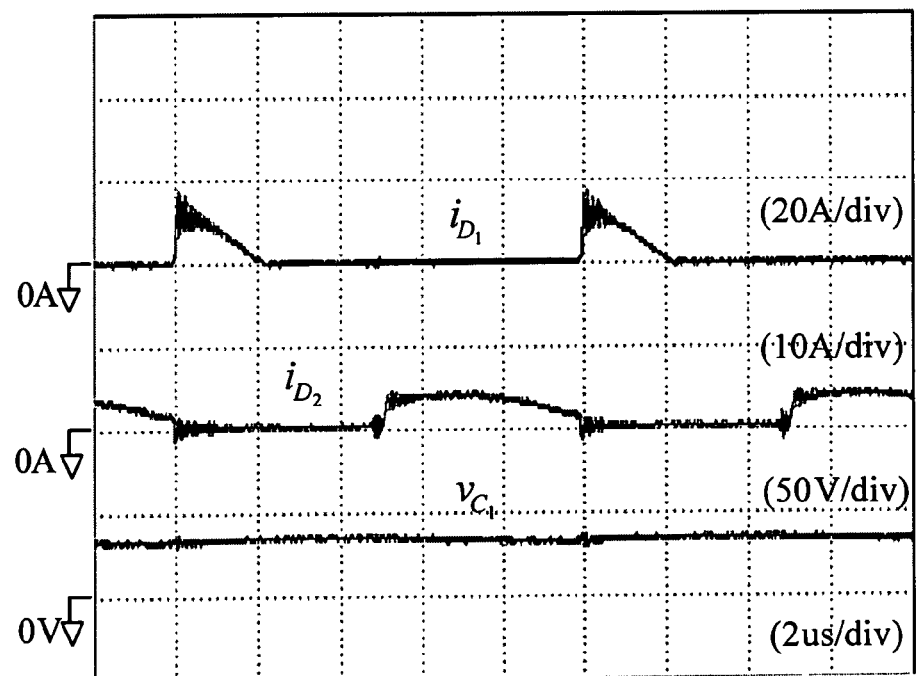
Figure 11E:
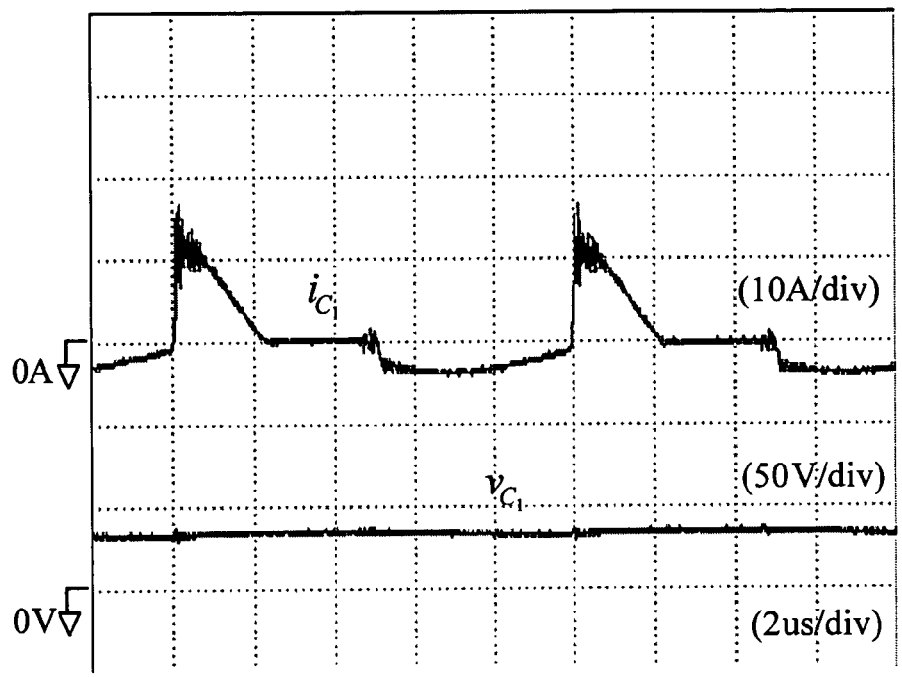
Figure 11F:
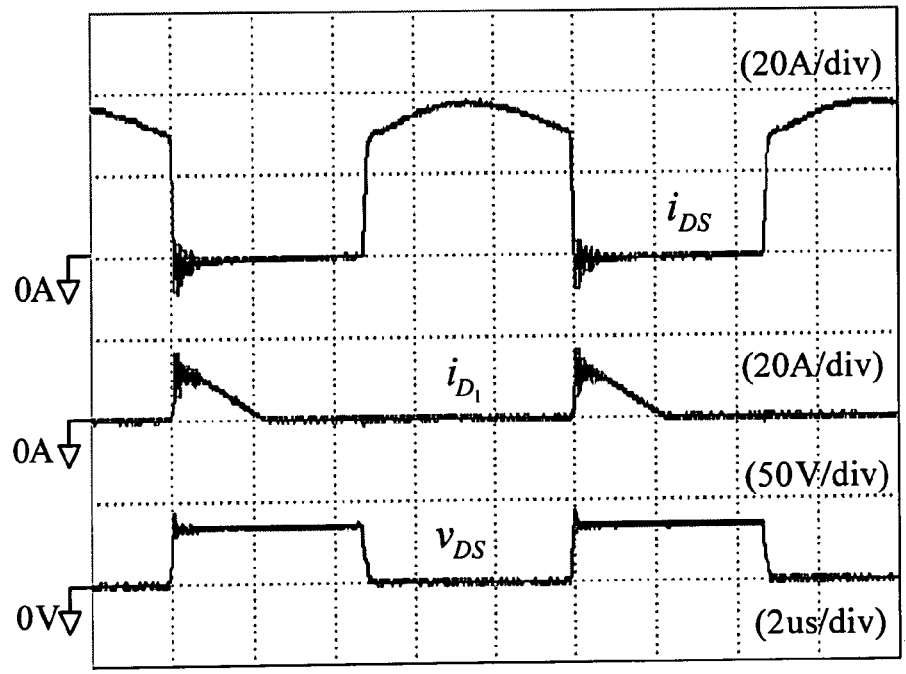
Figure 11G:
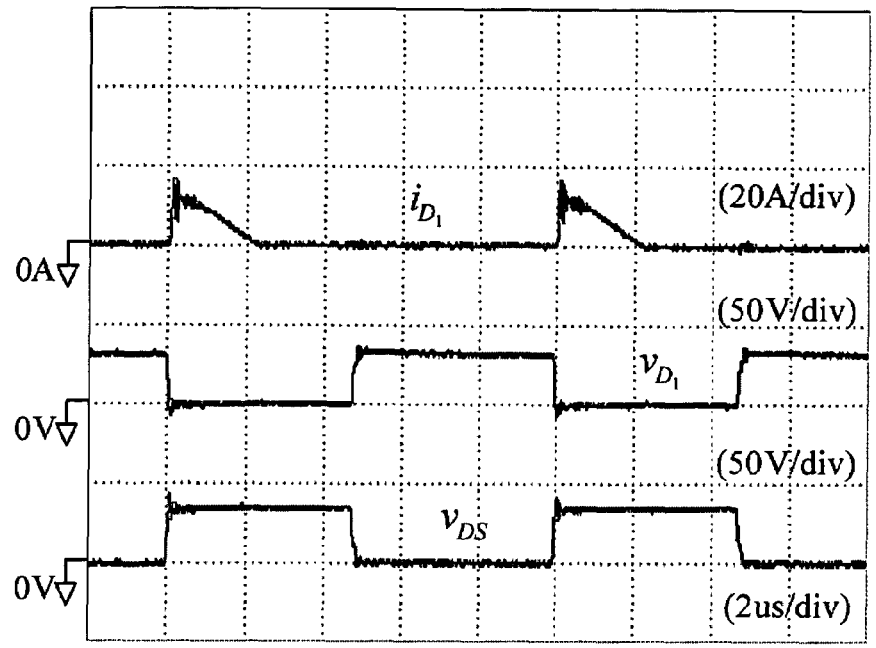
Figure 11H:
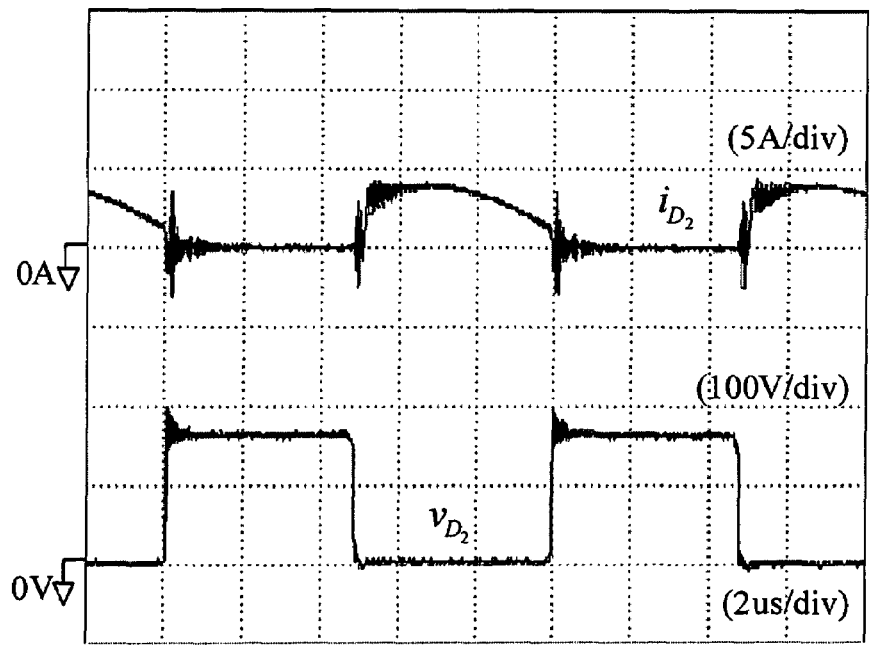
Figure 11I:
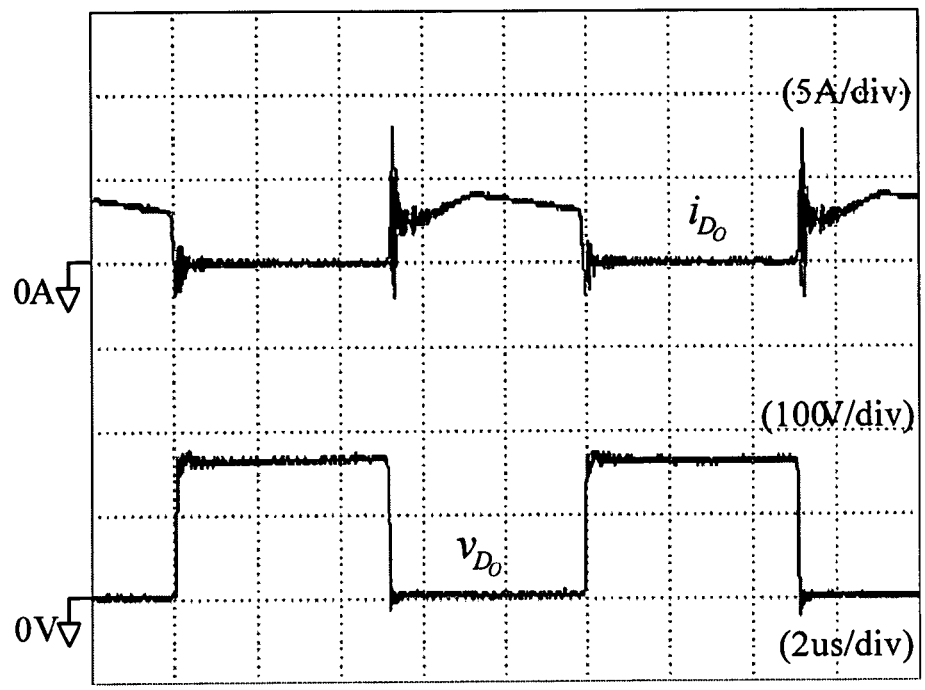
Figure 11J:
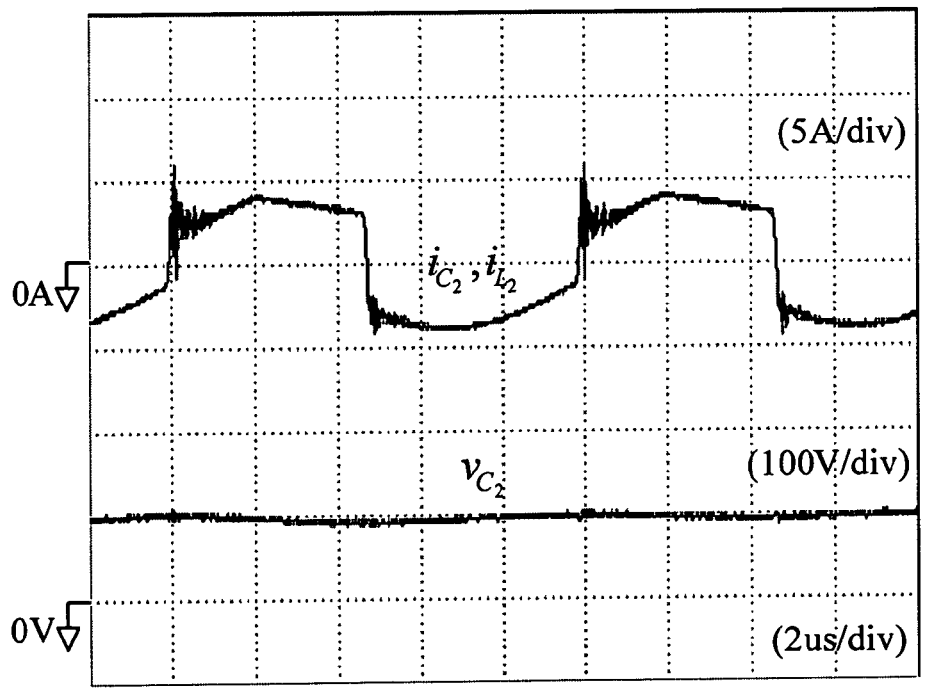
Figure 12A:
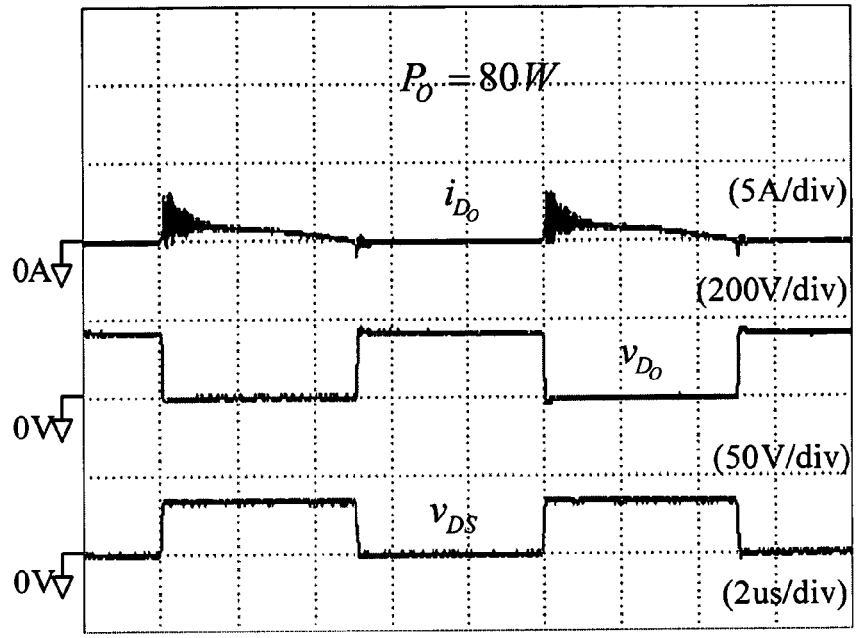
FIG. 12 is one embodiment of the DC/DC conversion circuit of the present invention, when voltage of solar panel reaches 200V and output power changes from 80 W to 320 W, $i_{D_O}$, $v_{D_O}$ and $v_{DS}$.
Figure 12B:
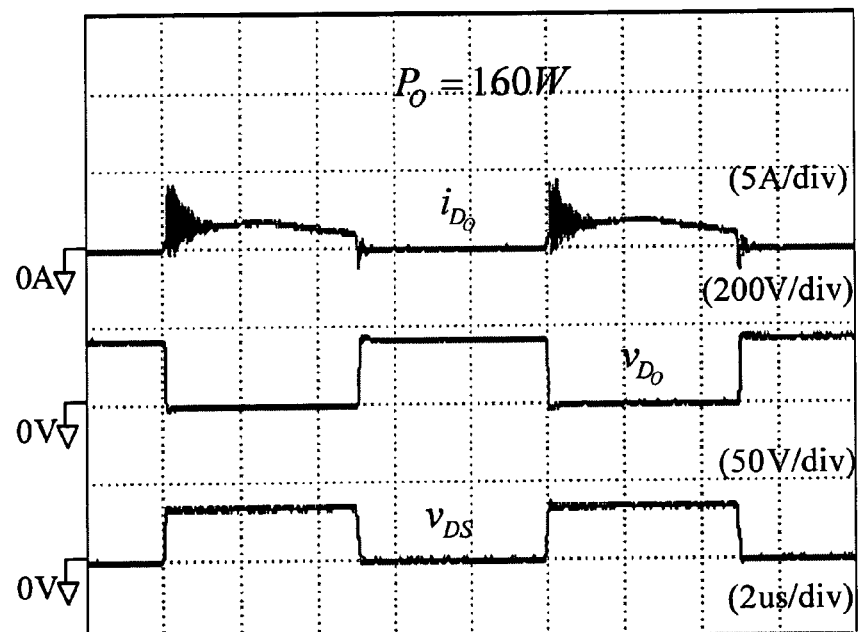
Figure 12C:
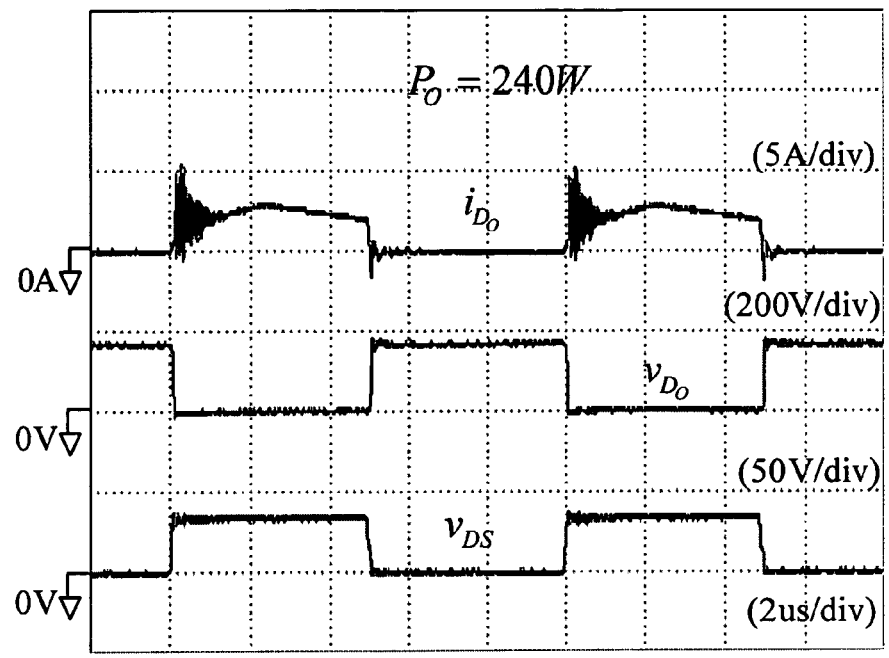
Figure 12D:
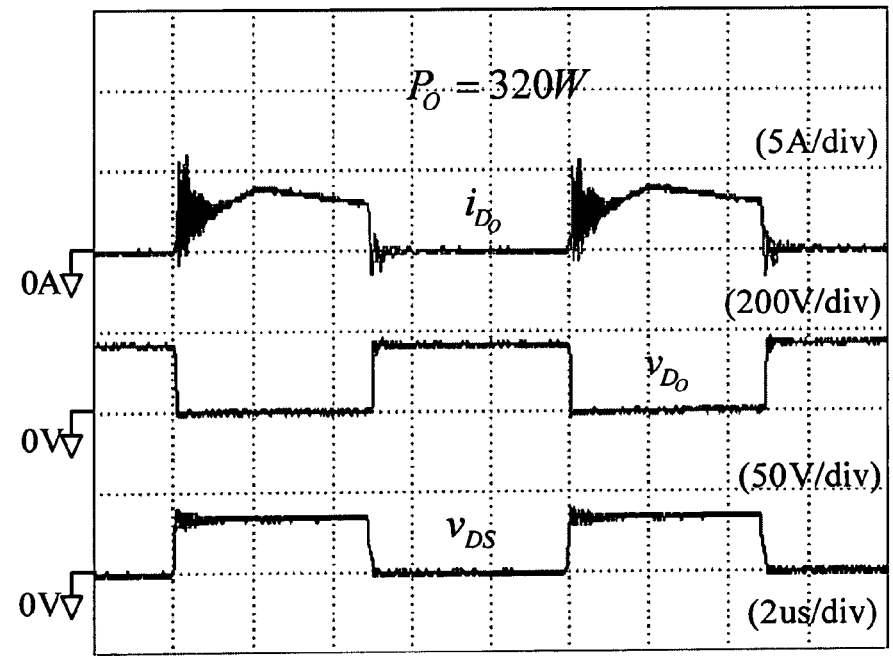

$D_1$: SB2060, 60V/20 A (Schottky), TO-220AC $D_2$, $D_O$: SB20200CT, 200V/20 A (Schottky), TO-220AB To help understand the high boost gain DC/DC conversion circuit implemented by the present invention, experiment waveforms of the exemplary embodiment are shown in following sections and please refer FIG. 2 for voltage and current signs of the circuit components.

The real responses for 40 W (light load) and 320 W (heavy load) of an output power of the high boost gain DC/DC conversion circuit are shown in FIGS. 10 and 11; from the figures, it can be seen that the voltage across switch is clamped to about 34V, and the switch current $i_{DS}$ is close to a square wave, showing the switch has near an optimum utilization rate and can reduce the conducting loss. By inspecting the voltage and current waveform of all the diodes, it shows that the reversal recovery currents are all lower than the conducting currents, and even when no snubber circuit is added, there exists no voltage spike across the diodes and are lower than the output voltage 200V, meaning that the diodes have achieved the voltage clamping and the soft switching purpose. It worthies mentioning that at light load, since the current is non-continuous, leakage induction at the first winding and the second winding of the coupled inductor will oscillate with the inner parasite capacitors of other components, as shown in FIG. 10, where $v_{DS}$ waveform is induced by the leakage induction of the first winding and the inner parasite capacitor of the switch.

Figure 13:
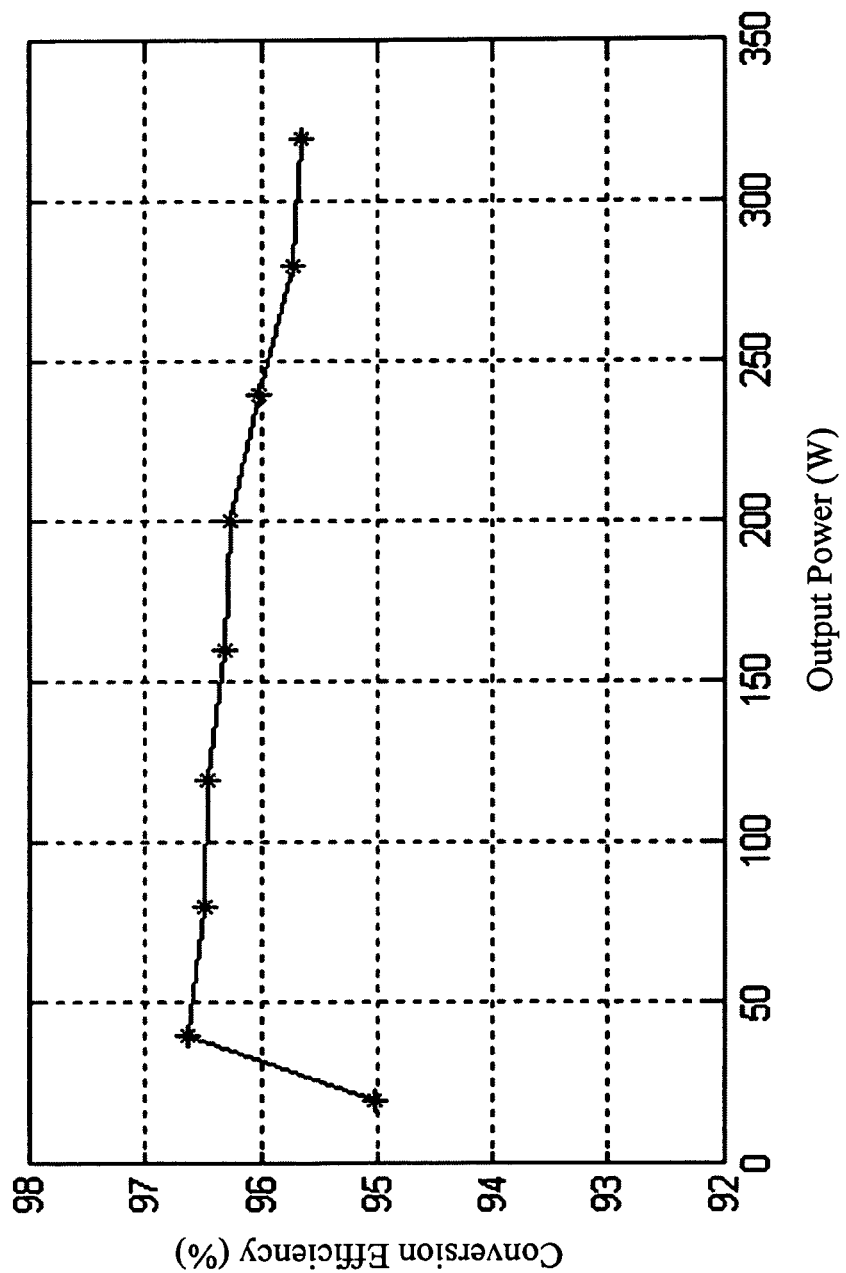
FIG. 13 is one embodiment of the DC/DC conversion circuit of the present invention, when voltage of solar panel reaches 200V and output power changes from 40 W to 320 W, conversion efficiency.

FIG. 12 shows the load of the high boost gain DC/DC conversion circuit gradually changes from 80 W to 320 W, where the response waveforms are current $i_{D_o}$ of the rectifying diode $D_O$, the voltage $v_{D_o}$ and the voltage $v_{DS}$ of the switch Q; it can be seen that under different loads, the diode's voltages are always under 200V, and voltage across the switch Q still has a good clamping effect. FIG. 13 shows the conversion efficiencies for different loads, the circuit highest conversion efficiency is over 96.5%, and the conversion efficiency is above 95% under light load; it shows effectiveness of the present invention.

The present invention uses TI DSP TMS320LF2407A to implement

The Adaptive Total Sliding-Mode Control (ATSMC); the selecting control variable $\alpha$=0.16 and $\lambda_g$=3.3, the switch's switching frequency is 20 kHz, and the detail circuit specification of the inverter is as follows:

$T_{A+}$, $T_{A-}$, $T_{B+}$, $T_{B-}$: IRFP264:250V/38 A
$L_f$: 7.5 mH

Figure 14:
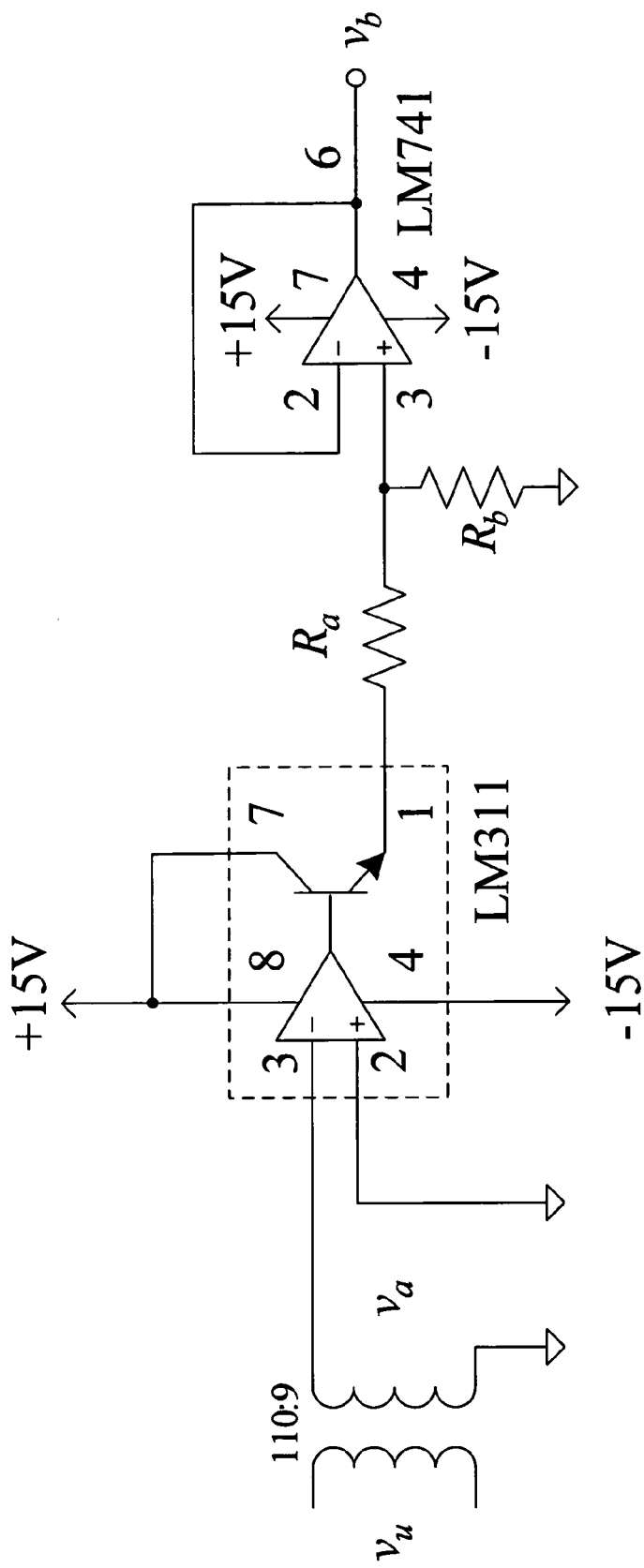
FIG. 14 is detection circuit for zero crossing point of utility-grid of the present invention.
Figure 15:
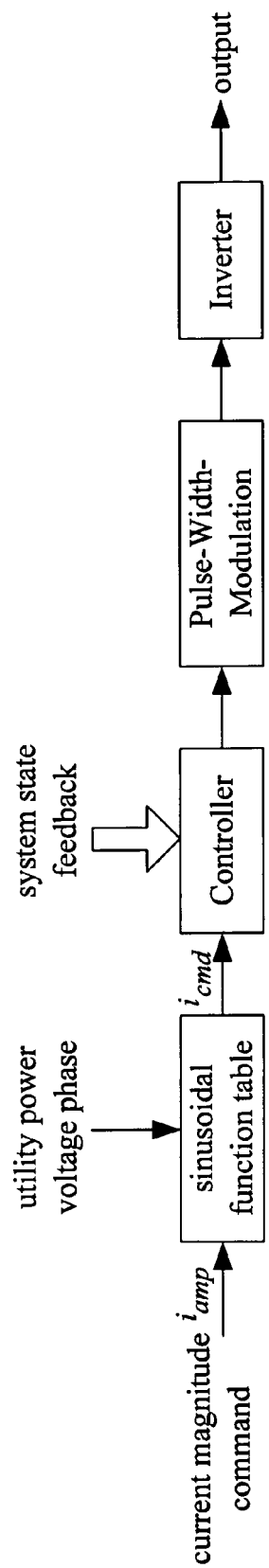
FIG. 15 is control flow of the present invention.

In order to produce a current command with the same frequency and phase as the utility-power grid such that the inverter's output current is controlled to match the utility-power grid voltage. The present invention uses a table to produce the sinusoidal function values to save calculation time, and utilizing a clock interruption function of the DSP to properly accumulate sinusoidal function pointer sp, making the current command in sync with the phase of the voltage frequency of the utility electricity; the interruption time is set to 166 μs, the utility electricity frequency is 60 Hz; in addition, the interruption time can be adjusted according to different situations, to increase system flexibility. The present invention uses the detection circuit of zero crossing with the utility electricity, as showed in FIG. 14, to obtain the utility electricity phase signal $v_b$ by processing the signal $v_a$ through a comparison circuit made of IC LM311, in which the signal $v_a$ is obtained by lowering the utility electrical voltage $v_u$ through a transformer; since the input upper limit for DSP external interruption pin is 3.3V, $v_b$ is first divided by a voltage divide circuit and then processed by a single stage voltage follower to obtain the trigger signal for external interruption function of the DSP; at the moment an external interruption occurs and the sinusoidal function table pointer is reset. To correct the phase difference between a sinusoidal current command and the utility electrical voltage; the control flow is shown as FIG. 15, where $i_{amp}$ is the current magnitude command, which can be determined by the maximum power tracking method.

Figure 16A:
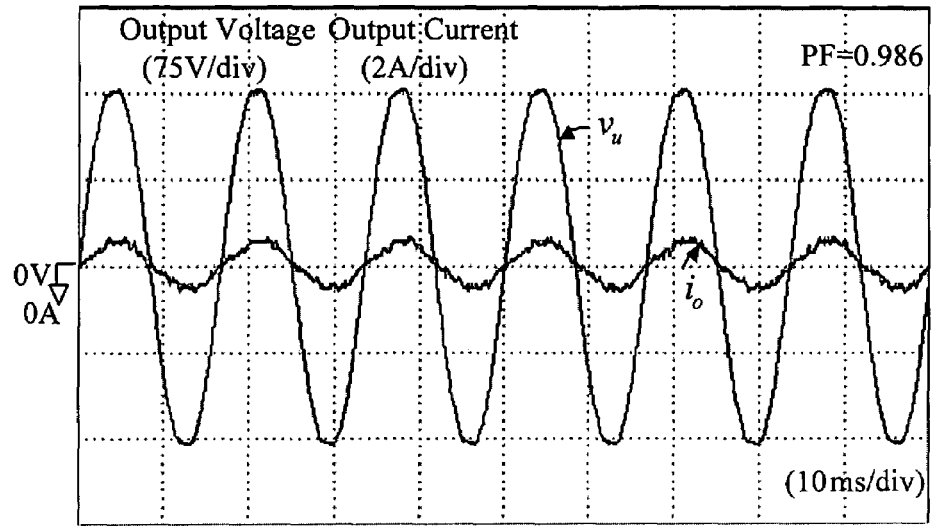
FIG. 16 is one embodiment of the Adaptive Total Sliding-Mode Control system of the present invention, real responses for light load and heavy load: (a) light load; (b) heavy load.
Figure 16B:
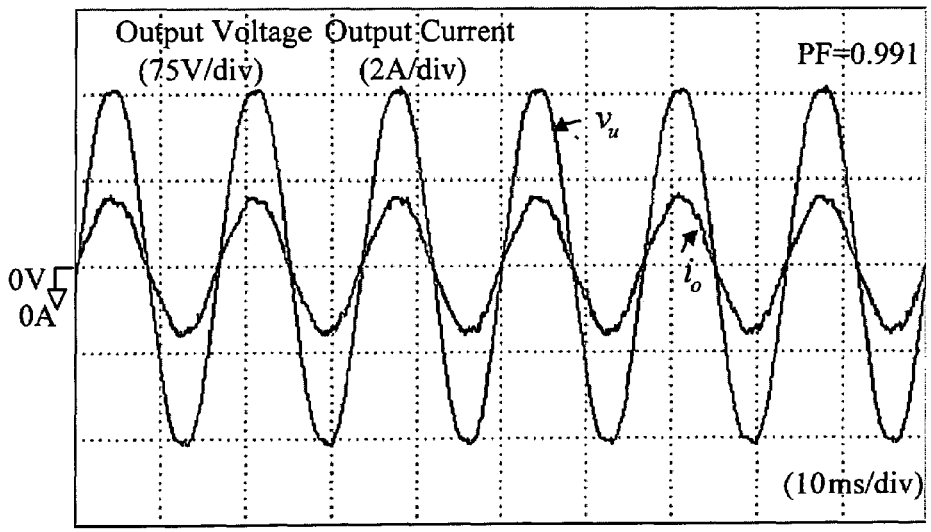
Figure 17A:
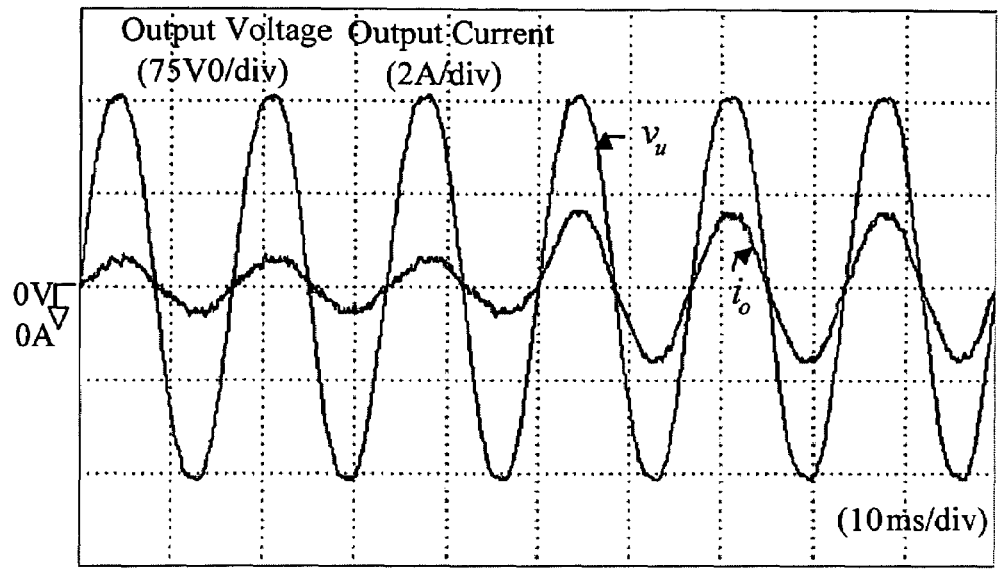
FIG. 17 is one embodiment of the Adaptive Total Sliding-Mode Control system of the present invention, real responses when load is changing: (a) light load to heavy load; (b) heavy load to light load; (c) no load to full load; (d) full load to no load.
Figure 17B:
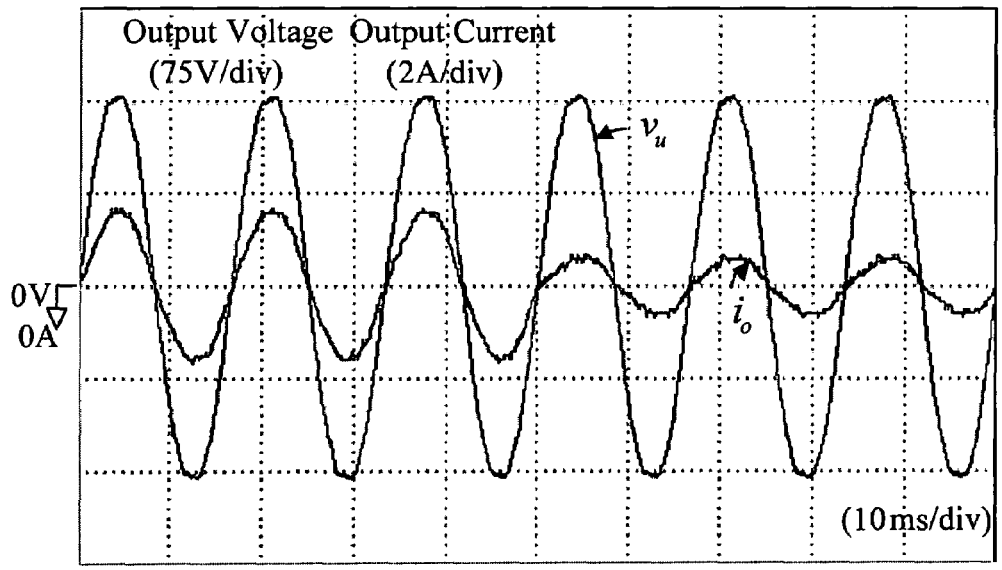
Figure 17C:
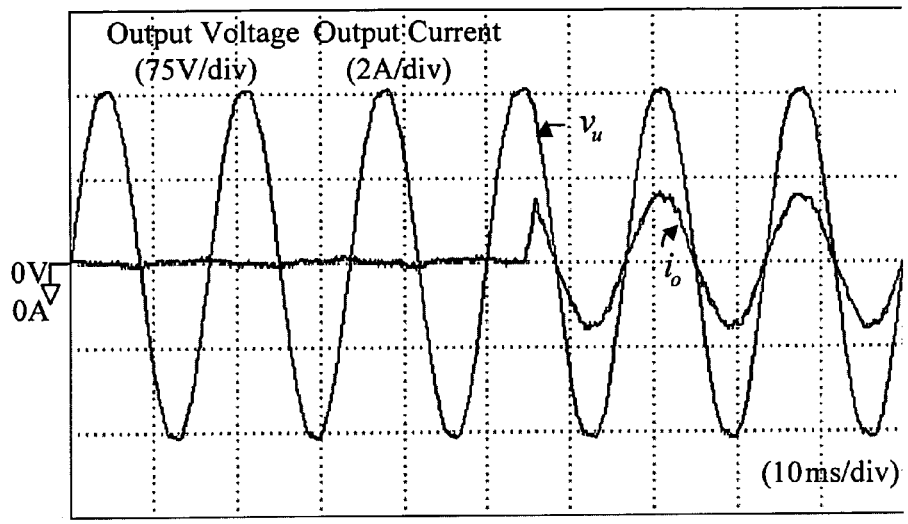
Figure 17D:
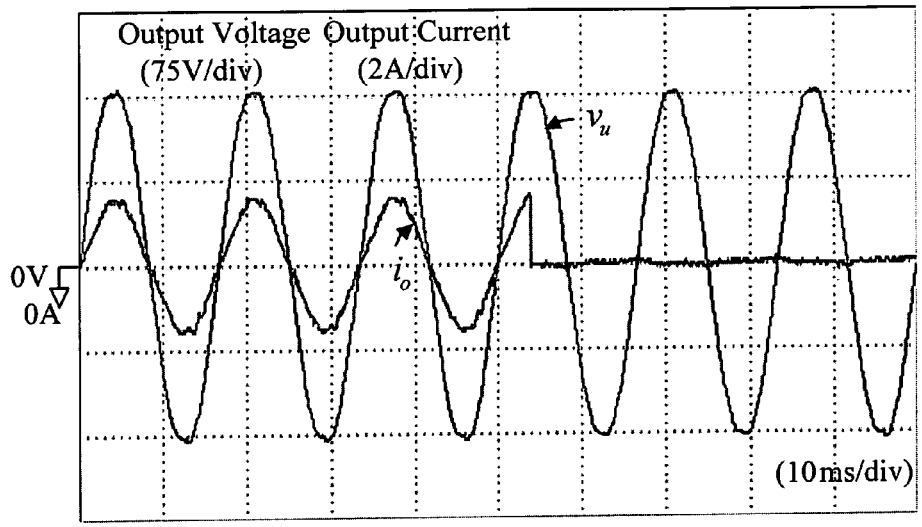

FIG. 16 shows waveforms of the utility voltage and the output current under light load and heavy load. It can be seen that the system has a good control response when it is stable, and the Power Factor (PF) is higher than 95%, specified by commercial products. The system real response through changing the load is shown in FIG. 17 for waveforms of the utility voltage and the output current, from light load to heavy load, heavy load to light load, no load to full load and full load to no load. It can be seen from the Fig. that when the load is changing, the system output and the current still can be effectively controlled, the output current and the utility voltage are almost the same in frequencies and phases, having a very high power factor that the system has good temporal and stable state control responses.

To rotate the solar panel, the present invention use a synchronous motor (model GL-301) as the driving device; if the input AC voltage is 110V, the power consumption is 15 W, and angle changing speed is 3° per second; the maximum load of the motor is 38 kg and it can be mounted on a rotation platform to control the angle of the solar panel.

Figure 18A:
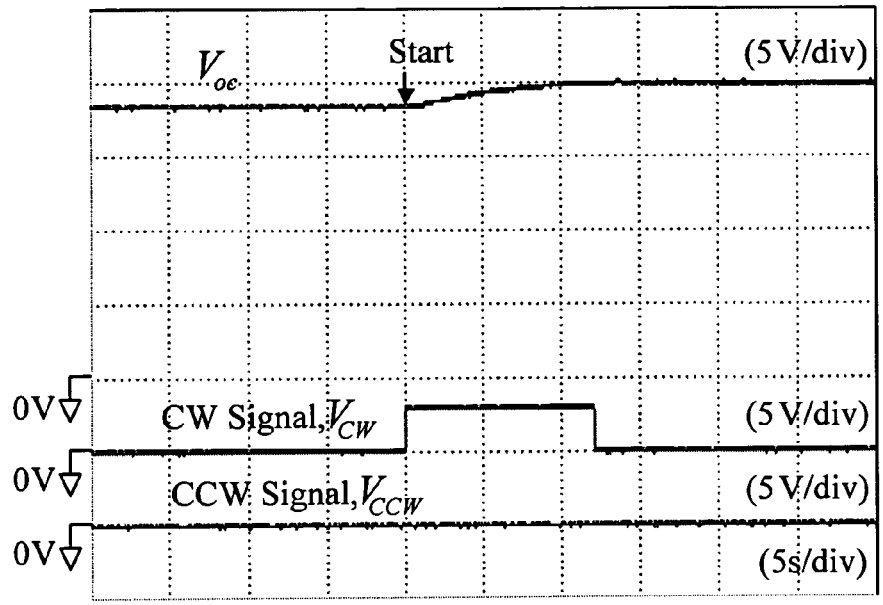
FIG. 18 is one embodiment of active tracking system of the present invention, real responses for with or without shadow: (a) no shadow condition; (b) shadow condition.
Figure 18B:
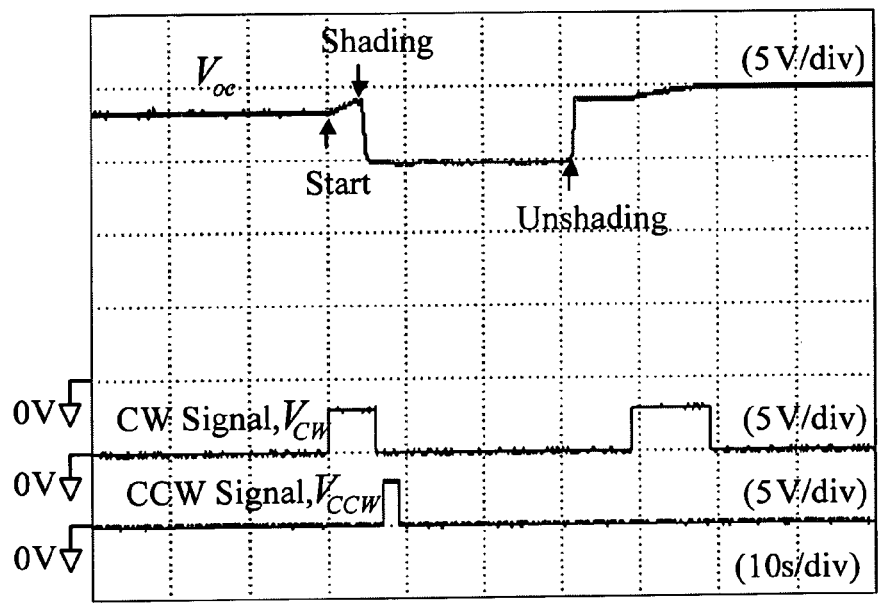
Figure 19A:
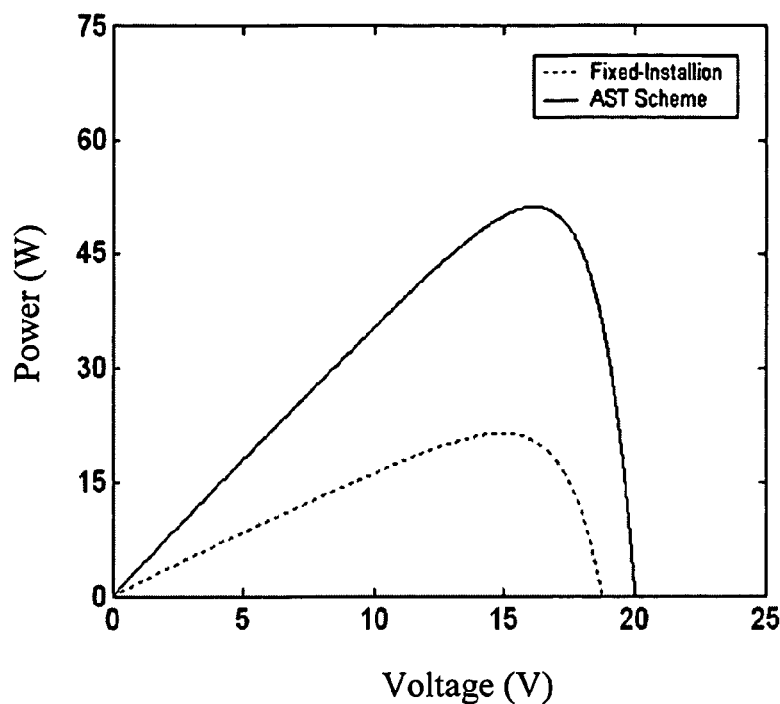
FIG. 19 is one embodiment of active tracking system of the present invention, system response comparison between fixed mounting and active tracking system: (a) output voltage vs. output power curves; (b) output voltage vs. output current curves.
Figure 19B:
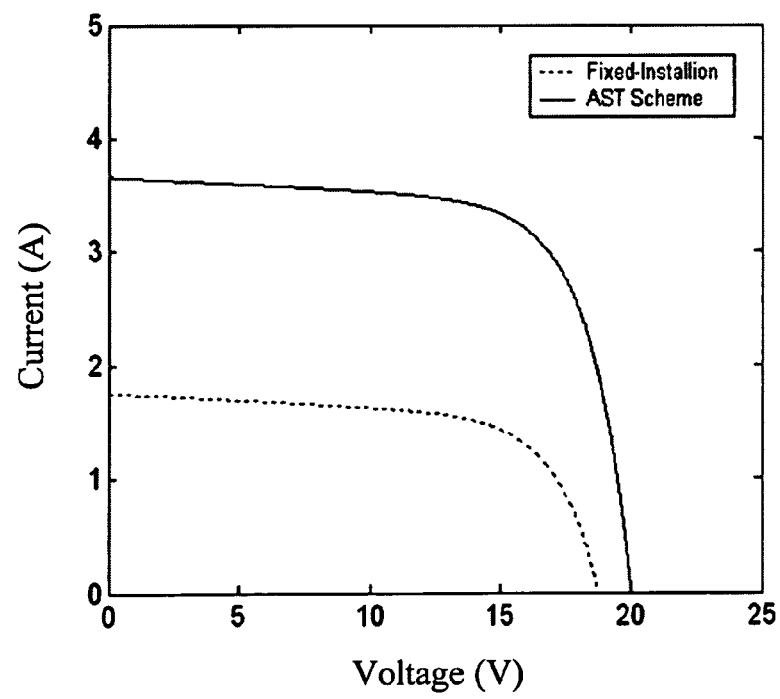
Figure 20A:
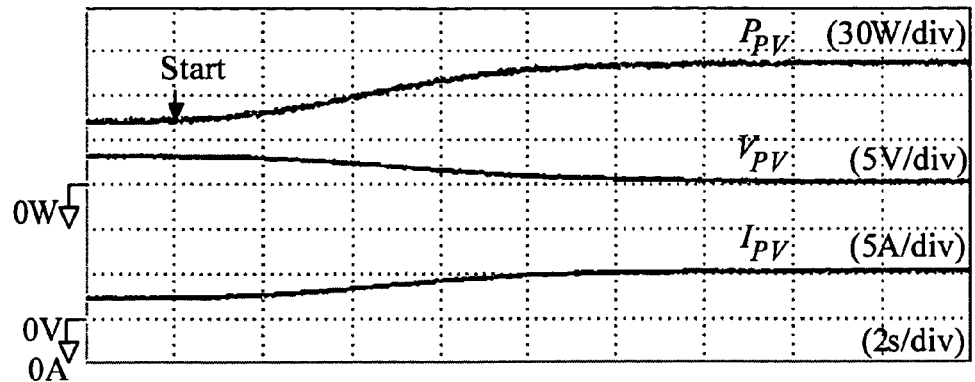
FIG. 20 is one embodiment of maximum power tracking system of the present invention, system response for perturbation step 0.15V: (a) relationship between output power, output voltage and input current; (b) dynamic tracking locus; (c) stable locus.
Figure 20B:
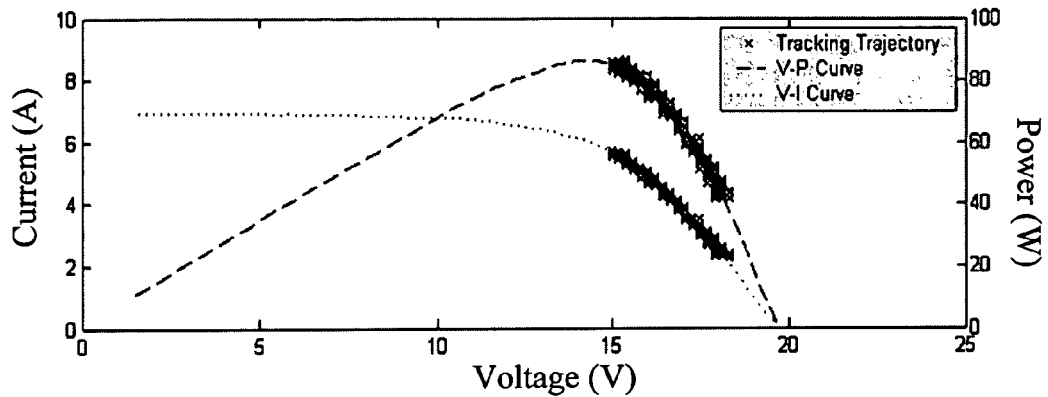
Figure 20C:
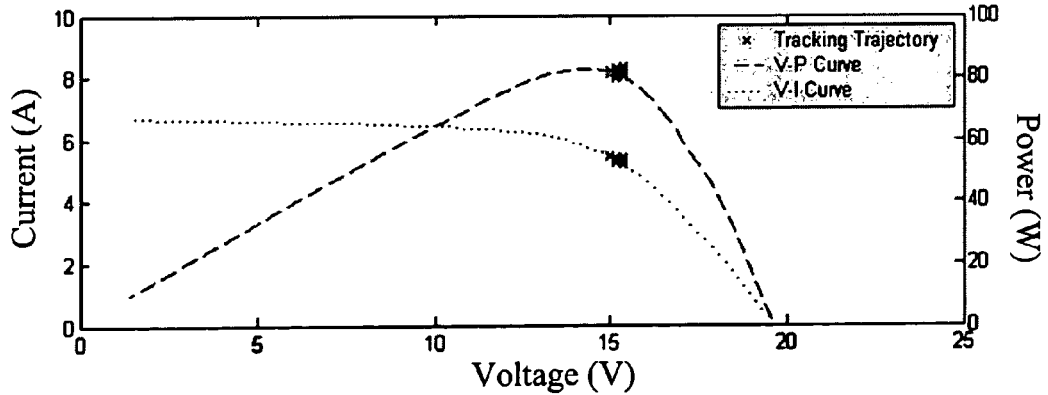

In morning, the solar panel of the active Sun tracking system starts facing east, the angle of the Sun tracking system does not have to be large to obtain relative large sunlight; at noon actual samples are taken around 3 p m, Oct. 5, 2005, the intensity is 67 mW/cm$^2$ and the panel temperature is 50° C., let the timing interruption be 1 ms, each time interval the motor rotate 3°/S, and selecting control parameters $t_r$=2, $t_w$=30. FIG. 18 is real response of the active sun tracking system under the shadow and no shadow conditions; in FIG. 18(*a*), after tracking process starts, the surface of solar panel is rotated by the motor, open circuit voltage changes from 18.5V to 20V along the surface's angle change. To test the impact caused by the external interference, a shadow condition is added in the test process. From FIG. 18(*b*), it can be seen that after a period of time, i.e., 34 second, the surface is blocked, the open circuit voltage decreases; the flow process goes back to previous position after it determines the voltage decreases, and waits for a period of time (about 30 sec.) to eliminate external interference; at 62 second, the shadow is removed, the open circuit voltage increases to a stable state, the surface resumes rotation once the flow process re-starts tracking, to complete the sun tracking. According to the open circuit voltage change and the panel temperature condition in FIG. 18, the simulation for a fixed panel installation and the active sun tracking system have been done, as shown in FIG. 19; and it can be seen that the open voltage of the active Sun tracking system increases from 18.5V to 20V due to the rotation, its short circuit current and output power are all increased, improving efficiency of conventional fixed installation system. The output power from solar panel of the active sun tracking system is greater than 15 W, the driving power needed by the sync motor; from the digital simulation proves the present invention is practical.

Figure 21A:
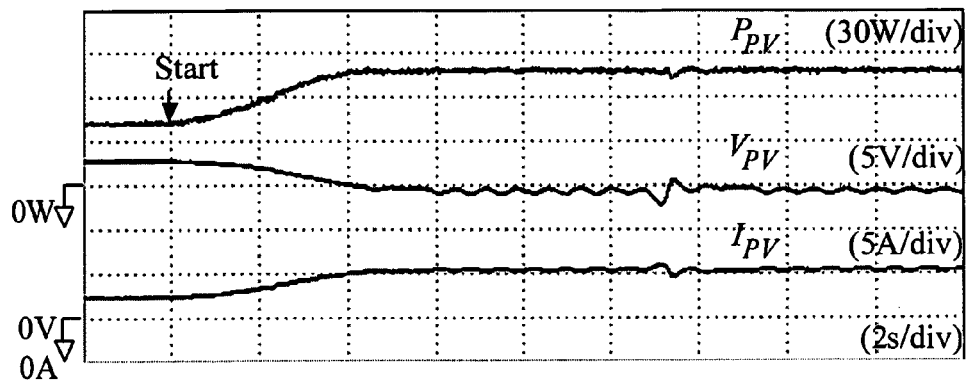
FIG. 21 is one embodiment of maximum power tracking system of the present invention, system response for perturbation step 0.3V: (a) relationship between output power, output voltage and input current; (b) temporal tracking locus; (c) stable locus.
Figure 21B:
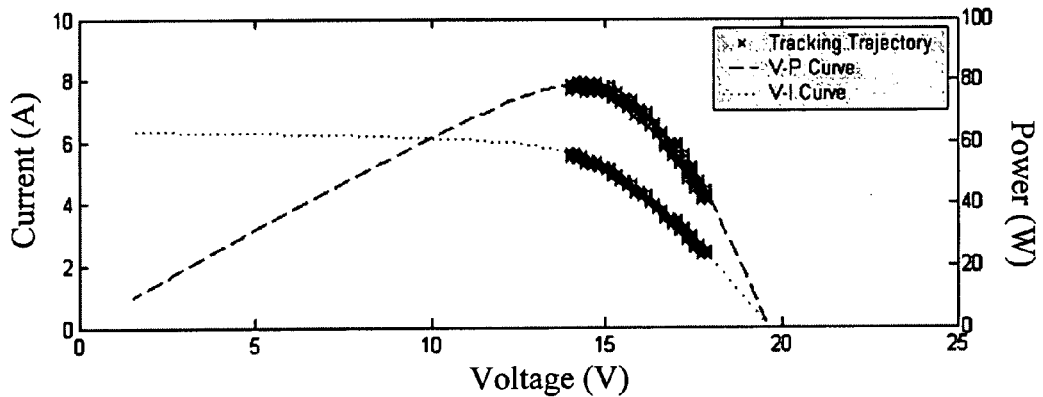
Figure 21C:
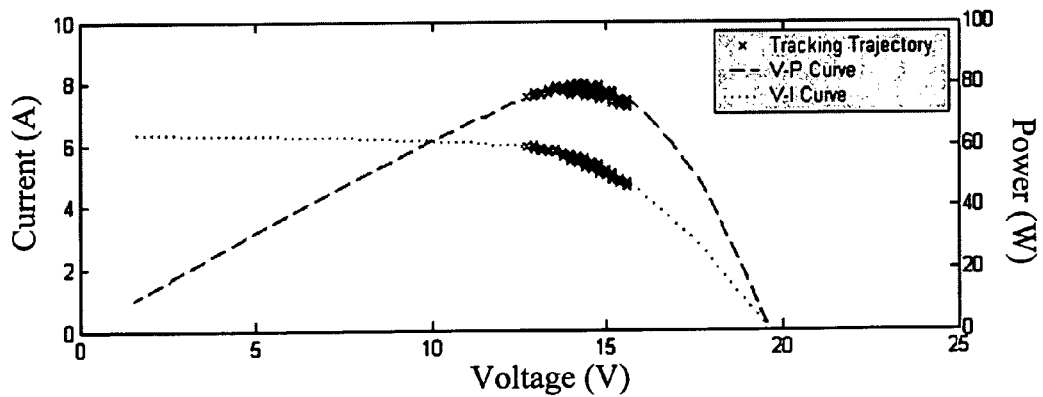
Figure 22A:
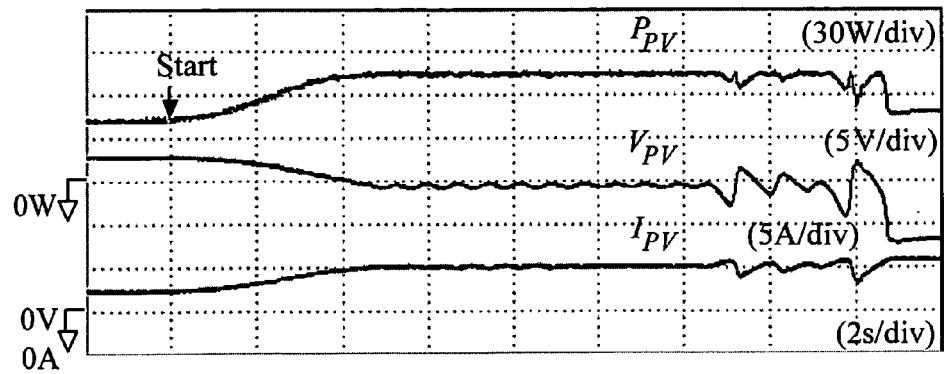
FIG. 22 is one embodiment of maximum power tracking system of the present invention, system response for perturbation step 0.3V(collapse): (a) relationship between output power, output voltage and input current; (b) temporal tracking locus; (c) stable locus.
Figure 22B:
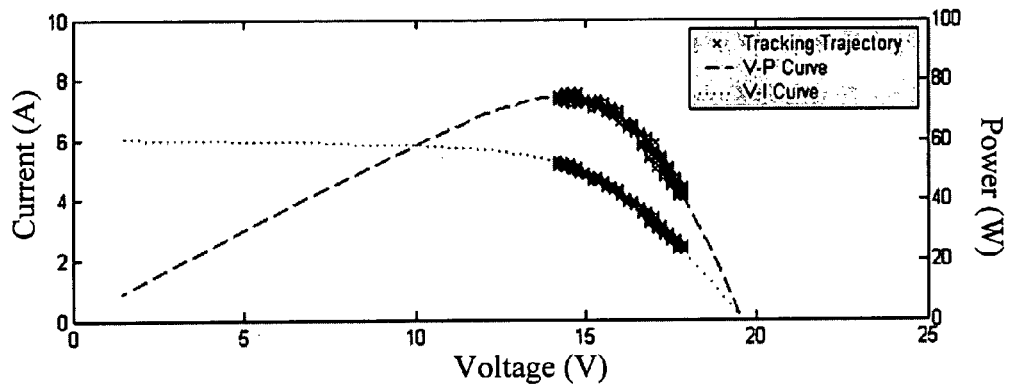
Figure 22C:
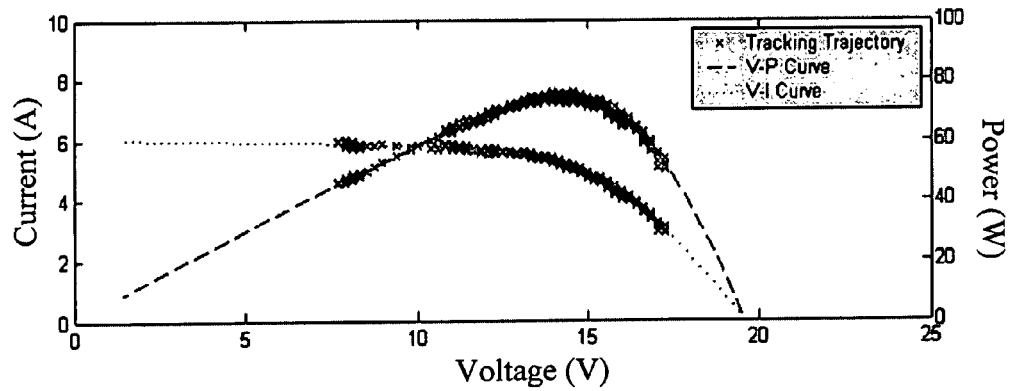
Figure 23A:
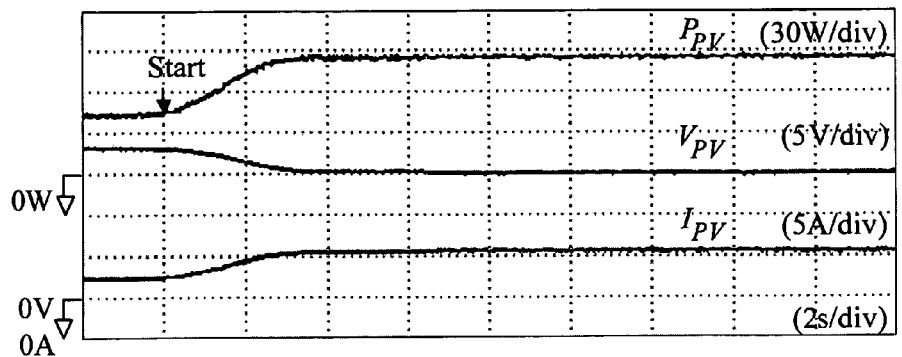
Figure 23B:
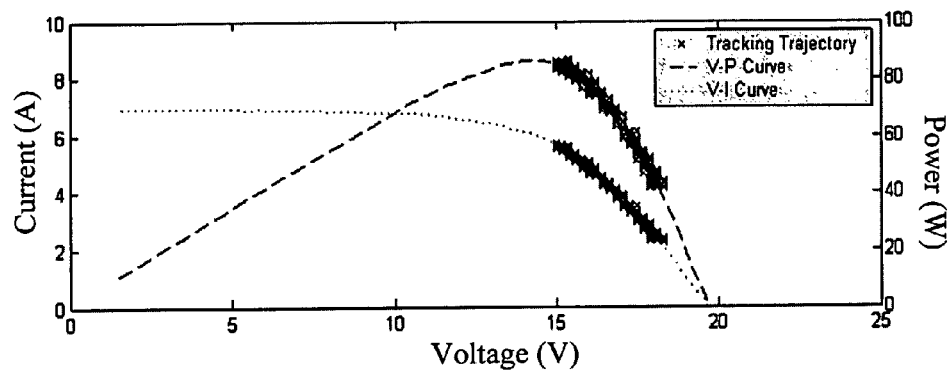
Figure 23C:
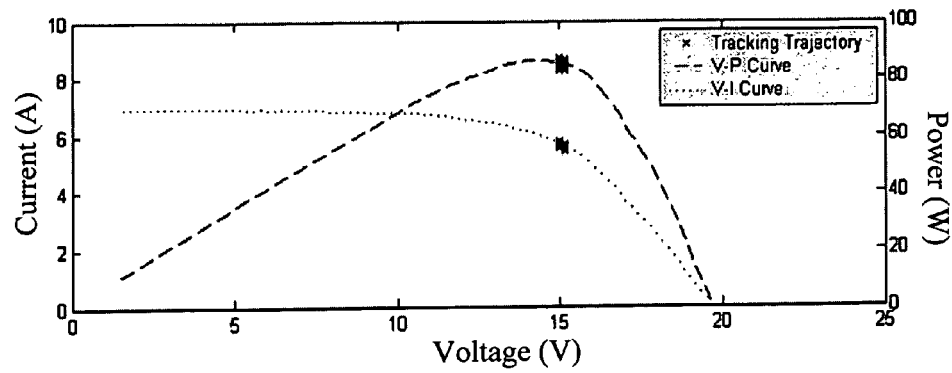

In FIG. 20-23, at afternoon, Nov. 6, 2005, the light intensity is 88 mW/cm$^2$ and panel temperature is 53° C., real responses are shown when the solar panel is used as the system input; the system control parameters are set as $k_p$=0.001, $\beta$=0.02. From FIG. 20, when the system uses a small step (0.15V) to make the perturbation, the tracking speed is slow, but it still can effectively follow the power curve to achieve the maximum power tracking, other than taking longer time; if increased the tracking speed is desired, the perturbation step has to be increased (0.3V), and its real response is shown in FIG. 21; the system needs less time to reach maximum power point; however, conventional perturbation and observation method uses fixed step, after reaching the maximum power point the system still uses large step which causes system to vibrated and power loss; when the system is not stable at the operating point and operates left half side of power curve, a drastic vibration will easily cause system collapse and damage the system, as shown in FIG. 22. FIG. 23 shows a real response of the adaptive step perturbation method, and it can be seen that the system uses less time to reach maximum power point, and has no vibration; either in the temporal tracking state or the stable operating state, the adaptive step perturbation method has a good maximum power tracking performance.

Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A high-performance solar photovoltaic (PV) energy conversion system, comprising:
   a solar panel, for absorbing Sun radiation and making photovoltaic conversion to produce electricity;
   a high-boost ratio DC/DC conversion circuit, converting low DC electricity to high voltage DC electricity, and outputting to a high voltage bus bar, the high-boost ratio DC/DC conversion circuit comprising:
      a first winding circuit comprising a power semiconductor switch and a first winding of a coupling inductor, the polar terminal of the first winding of a coupling inductor being defined as connecting to the positive post of the DC input circuit,
      a passive regenerative snubber circuit comprising a clamping diode, a discharging diode and a clamping capacitor,
      a second winding circuit comprising a high voltage capacitor and a second winding of the coupling inductor, the polar terminal of the second winding of the coupling inductor being defined as connecting to the high voltage capacitor, and
      a filter circuit comprising a filter capacitor and a rectification diode;
   a system controller, containing a microprocessor and a drive circuit, responsible for system control;
   a full-bridge inverter comprising, four power semiconductors switches, connects to the high voltage bus bar, controlled by the system controller to be used in converting DC voltage to AC voltage;
   a clamping inductor, connecting between the full-bridge inverter and utility-grid, used for filtering high frequency components in the output voltage of the inverter, and converting AC voltage output to AC current output; and
   a driving device, a low power motor to support and drive the solar panel, and controlled by the system controller to change surface angle of the solar pane, wherein said microprocessor executes a total sliding mode control strategy, a sun tracking strategy and an adaptive step-perturbation method; establishes Sinusoidal Pulse-Width-Modulation output module, outputting Pulse-Width-Modulation signal; and through the inverter drive circuit drives the power semiconductor switch of the full-bridge inverter to control the output current of the inverter.

2. The system as claimed in claim 1, wherein said total sliding mode control strategy comprising:
   a system performance plan, planning expected system effectiveness under normal condition;
   a curbing controller, eliminating interfering voltage induced by changes in the system parameters, load and unpredictable interference from un-modulized system dynamic state; and
   an adaptive observation design, estimating upper boundary of sum of uncertain variables, avoiding control vibration phenomena caused by improper choice of upper boundary of the curbing controller.

3. The system as claimed in claim 1, wherein said Sun tracking strategy executed by the microprocessor is through feedback open circuit voltage of the solar panel to determine rotation direction of the surface of the solar panel and through output signal from the microprocessor to drive the driving device in order to obtain maximum Sun energy.

4. The system as claimed in claim 1, wherein said adaptive step-perturbation method is through feedback output voltage and output current of the solar panel to calculate variation in output power and output voltage to adjust step-perturbation voltage, and through indirect control of output current of the inverter to control output voltage of the solar panel.

* * * * *